United States Patent
Li et al.

(10) Patent No.: US 9,134,415 B2
(45) Date of Patent: Sep. 15, 2015

(54) WIDEBAND WAVEFORM SYNTHESIS USING FREQUENCY JUMP BURST-TYPE WAVEFORMS

(71) Applicants: Ke Yong Li, Forest Hills, NY (US); Vinay Mudinoor Murthy, Elmont, NY (US); Faruk Uysal, West New York, NJ (US); Unnikrishna Sreedharan Pillai, Harrington Park, NJ (US)

(72) Inventors: Ke Yong Li, Forest Hills, NY (US); Vinay Mudinoor Murthy, Elmont, NY (US); Faruk Uysal, West New York, NJ (US); Unnikrishna Sreedharan Pillai, Harrington Park, NJ (US)

(73) Assignee: C&P TECHNOLOGIES, INC., Closter, NJ (US)

( * ) Notice: Subject to any disclaimer, the term of this patent is extended or adjusted under 35 U.S.C. 154(b) by 203 days.

(21) Appl. No.: 14/075,543

(22) Filed: Nov. 8, 2013

(65) Prior Publication Data
US 2015/0130660 A1 May 14, 2015

(51) Int. Cl.
G01S 13/90 (2006.01)
G01S 13/524 (2006.01)

(52) U.S. Cl.
CPC ............ *G01S 13/9035* (2013.01); *G01S 13/524* (2013.01); *G01S 13/90* (2013.01); *G01S 13/9029* (2013.01)

(58) Field of Classification Search
CPC ............ G01S 13/90–13/9094; G01S 2013/90; G01S 2013/9035
USPC ........ 342/25 A, 25 B, 25 C, 25 D, 25 E, 25 F, 342/175, 179, 195
See application file for complete search history.

(56) References Cited

U.S. PATENT DOCUMENTS

| | | | | |
|---|---|---|---|---|
| 5,559,517 | A * | 9/1996 | Didomizio | 342/156 |
| 5,808,580 | A * | 9/1998 | Andrews, Jr. | 342/162 |
| 5,926,125 | A * | 7/1999 | Wood | 342/25 F |
| 6,072,420 | A * | 6/2000 | Hellsten | 342/25 A |
| 6,087,981 | A * | 7/2000 | Normant et al. | 342/134 |
| 6,400,306 | B1 * | 6/2002 | Nohara et al. | 342/25 R |
| 6,750,809 | B1 * | 6/2004 | Cho et al. | 342/129 |
| 6,781,540 | B1 * | 8/2004 | MacKey et al. | 342/25 F |
| 8,378,878 | B2 * | 2/2013 | Burri et al. | 342/25 R |
| 8,803,732 | B2 * | 8/2014 | Antonik et al. | 342/160 |
| 2005/0073455 | A1 * | 4/2005 | Chow et al. | 342/25 F |
| 2006/0109161 | A1 * | 5/2006 | Krikorian et al. | 342/25 B |
| 2012/0032839 | A1 * | 2/2012 | Burri et al. | 342/25 F |
| 2012/0056780 | A1 * | 3/2012 | Antonik et al. | 342/25 B |
| 2014/0111374 | A1 * | 4/2014 | Case et al. | 342/25 F |
| 2015/0130660 | A1 * | 5/2015 | Li et al. | 342/25 F |

OTHER PUBLICATIONS

Gorham and Moore, SAR image formation toolbox for MATLAB, Air Force Research Laboratory, Sensors Directorate 2241 Avionics Circle, Bldg 620, WPAFB, OH 45433-7321.
Murthy, Pillai, and Davis, Waveforms for Simultaneous SAR and GMTI, 978-1-4673-0658-4/12/$31.00 (c) 2012 IEEE; pp. 51-56.
Davis, Challenges of Ultra Wideband, Multi-Mode Radar.
(Continued)

*Primary Examiner* — Peter Bythrow
(74) *Attorney, Agent, or Firm* — Walter J. Tencza, Jr.

(57) ABSTRACT

Methods are provided for obtaining wideband waveforms from a set of narrowband waveforms. The synthesized wideband waveforms are suitable for generating fine range resolution synthetic aperture radar images. Furthermore, narrowband pulse compressed data can be siphoned from the processing chain to be used in multi-look GMTI processing either independently or jointly.

15 Claims, 23 Drawing Sheets

(56) References Cited

OTHER PUBLICATIONS

Lord and Inggs, High Resolution, SAR Processing Using Stepped-Frequencies, Radar Remote Sensing Group, Dept. of Electrical Engineering, University of Cape Town.

Cumming and Wong, digital processing of Synthetic Aperture Radar Data, pp. 6-7.

Soumekh, Synthetic Aperture Radar Signal Processing with MATLAB Algorithms, pp. 373-374.

* cited by examiner

820

902

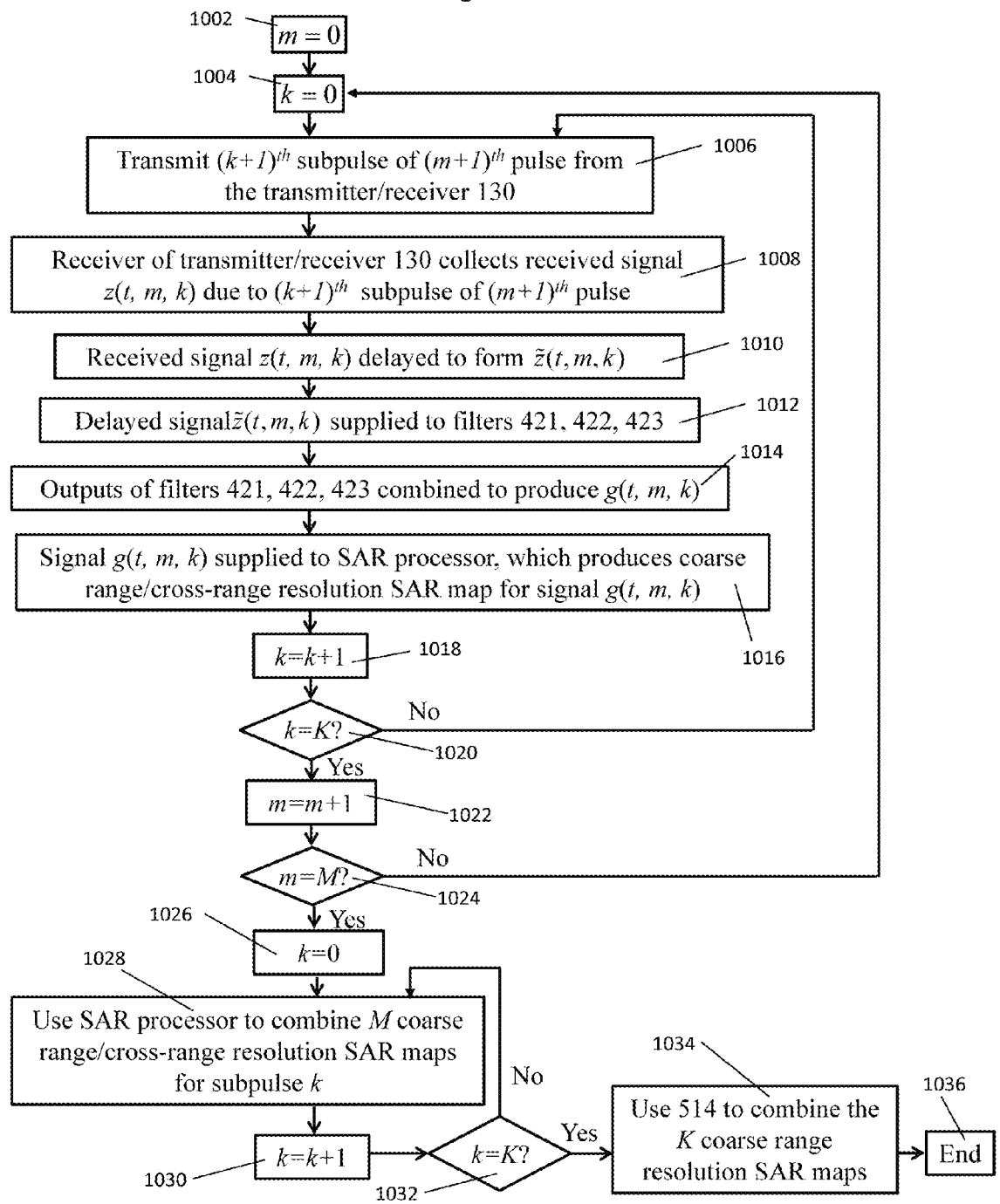

WIDEBAND WAVEFORM SYNTHESIS USING FREQUENCY JUMP BURST-TYPE WAVEFORMS

STATEMENT REGARDING FEDERALLY SPONSORED RESEARCH OR DEVELOPMENT

The present invention is based upon work supported and/or sponsored by the Information Innovation Office, Defense Advanced Research Project Agency (DARPA), Arlington, Va., under SBIR Phase II contract No. D11PC20007.

FIELD OF THE INVENTION

This invention relates to methods for wideband synthesis at a receiver when a set of Frequency Jump Burst (FJB)-type waveforms is used at the transmitter. For data obtained using a wideband linear frequency modulation (LFM) waveform that has been split into multiple pieces, wideband synthesis provides a method for creating a synthetic aperture radar (SAR) image with characteristics similar to an image obtained using the original long waveform

BACKGROUND OF THE INVENTION

Simultaneous multi-mode surveillance provides enhanced situational awareness providing several concurrent data products that complement one another. Synthetic aperture radar (SAR) and ground moving target indication (GMTI) are traditionally performed separately, either on separate platforms or on a single platform employing mode switching, as they have differing requirements. Recent efforts in the field have in part concentrated on exploiting a common data source for both modalities in order to perform them simultaneously.

To this end, the frequency jump burst (FJB) waveform is a likely candidate for a common SAR/GMTI waveform as the narrowband transmit waveforms provide processing flexibility at the receiver. Each of the subpulses comprising the FJB can be processed independently of the others for GMTI—yielding multiple looks. For SAR, the waveforms must be combined in some fashion to yield the expected range resolution promised by the overall transmit bandwidth. This topic is the main focus of this invention, in which we present a novel method for wideband synthesis (WBS).

In a previous method used by Lord, Davis, et al, an appropriate time delay is applied to each of the received waveforms to synthesize wideband waveforms prior to pulse compression (V. Murthy, U. Pillai and M. E. Davis, "Waveforms for Simultaneous SAR and GMTI," in *Proceedings of the 2012 IEEE Radar Conference*, Atlanta, Ga. May 7-11, 2012; M. Davis, "Challenges of Ultra Wideband, Multi-Mode Radar," 2011 *IEEE CIE International Conference on Radar*, vol. 1, October 2011, pp. 5-8; R. Lord and M. Inggs, "High Resolution SAR Processing Using Stepped Frequencies," IEEE IGARSS '97, 1997). Here each $(k+1)^{th}$ subpulse is delayed by $kT$, where T is the subpulse duration and $0 \le k \le K-1$. Therefore no time delay is applied to the first subpulse, and all subsequent subpulses are adjusted accordingly ("the first subpulse" refers to the first subpulse in each sequence of K). This method is fairly intuitive, as it mimics construction of a wideband linear frequency modulation (LFM) waveform where each segment contains a different portion of the entire spectrum and increases (or decreases) as a function of time.

Once the wideband waveform is synthesized and the wideband matched filter is generated, SAR imaging can be applied to the pulse compressed data. The position from which the first subpulse was transmitted is used in the SAR imaging algorithm, as all of the other K–1 subpulses are compensated to the position of the first subpulse. This method works well for far ranges, and particularly at broadside and low integration angles.

At either near range, or when the squint angle is significant (greater than three to four degrees,) this method does not work very well. At broadside and far range the differential delays between the subpulses can be written as kT, for the $(k+1)^{th}$ subpulse (V. Murthy, U. Pillai and M. E. Davis, "Waveforms for Simultaneous SAR and GMTI," in *Proceedings of the 2012 IEEE Radar Conference*, Atlanta, Ga. May 7-11, 2012; M. Davis, "Challenges of Ultra Wideband, Multi-Mode Radar," 2011 *IEEE CIE International Conference on Radar*, vol. 1, October 2011, pp. 5-8; R. Lord and M. Inggs, "High Resolution SAR Processing Using Stepped Frequencies," IEEE IGARSS '97, 1997). It would appear, from the point spread functions generated for various cases, that this is an approximation to the true differential delay between the subpulses which is accurate under the conditions that the scene being imaged is at far range (>20 km) and at or near broadside. The true parabolic delays can be computed for each pixel imaged, and for every platform position and every sensor/subarray. However this brute-force processing leads to significant redundancy and an extremely high computation cost.

We begin first by establishing the signal model for the LFM base case to which the wideband synthesis method will be compared to. The LFM signal of length KT $$f(t)=e^{j2\pi\beta t^2}, 0 \le t \le KT \quad (1)$$

is modulated with an RF carrier at frequency $f_0$ and transmitted. $\beta$ in (1) is the chirp rate and the total bandwidth of the waveform in (1) is given by $$BW=2\beta KT. \quad (2)$$

The transmit signal is given by $$s(t)=f(t)e^{j2\pi f_0 t}. \quad (3)$$

The receive waveform $z_{x,y}(t,m)$ is a function of both fast time t and pulse index $0 \le m \le M-1$ $$z_{x,y}(t,m)=\alpha_{x,y}s(t-\tau_m(x,y)) \quad (4)$$

where $\Sigma_m(x,y)$ represents the two-way delay between the platform and a scatter point located at (x,y) for the $m^{th}$ pulse; $\alpha_{x,y}$ represents the scatterer coefficient for the scatter located at (x,y). The total received data for the LFM waveform is given by $$z(t, m) = \sum_{x,y} z_{x,y}(t, m) = \sum_{x,y} \alpha_{x,y} s(t - \tau_m(x, y)) \quad (5)$$

where the received signals due to different scatters are summed together. The data is ready to be pulse compressed as using the matched filter $h(t)=f^*(t)$. Once pulse compression has been applied as $$g(t,m)=z(t,m) \circledast h(t). \quad (6)$$

An imaging algorithm can be used to obtain the final SAR map $$SAR_{LFM}(\tilde{x}, \tilde{y}) = \sum_{m=0}^{M-1} g(t + \tau_m(\tilde{x}, \tilde{y}), m) \quad (7)$$

$$= M\alpha_{\tilde{x},\tilde{y}}s(t) \circledast h(t) +$$

$$\left( \sum_{m=0}^{M-1} \sum_{\substack{x,y, \\ (\tilde{x},\tilde{y}) \ne (x,y)}} \alpha_{x,y} s(t - [\tau_m(x, y) - \tau_m(\tilde{x}, \tilde{y})]) \right) \circledast h(t)$$

where $\tilde{x}$ and $\tilde{y}$ are the image coordinates in terms of meters. The SAR image formation in (7) align the return signals due to M pulses according two-way delay between the platform position and the image point $(\tilde{x},\tilde{y})$. The SAR imaging algorithm can be the backprojection imaging algorithm (L. A. Gorham and L. J. Moore., "SAR image formation toolbox for MATLAB," *Algorithms for Synthetic Aperture Radar Imagery XVII*, 7669, 2010.). Notice that the term $M\alpha_{\tilde{x},\tilde{y}}s(t) \circledast h(t)$ in (7) represents the mainlobe and it corresponds to the contribution from the scatterer located at the image point $(\tilde{x},\tilde{y})$ and the term $$\left( \sum_{m=0}^{M-1} \sum_{\substack{x,y, \\ (\tilde{x},\tilde{y}) \neq (x,y)}} \alpha_{x,y} s(t - [\tau_m(x,y) - \tau_m(\tilde{x},\tilde{y})]) \right) \circledast h(t)$$

represents the sidelobe and it corresponds to the contributions from scatterers located at other locations.

The LFM case can be used as a known prior art base case to which one or more embodiments of the present invention will be compared later in this application. Now that we have a base case to compare to, we can look at the frequency jump burst (FJB) waveform. The FJB waveform at intermediate frequency (IF) is given by $$f(t,k) = e^{j2\pi\beta(t+kT)^2}, 0 \leq t \leq T \quad (8)$$

where $\beta$ is the chirp rate and $0 \leq k \leq K-1$ is the subpulse index over the K subpulses. The bandwidth of each subpulse is BW/K. The transmit signal corresponding to (8) is $$s(t,k) = f(t,k)e^{j2\pi f_0(t+kT)}, \quad (9)$$

An advantage of writing the FJB waveform in this manner is that the phase between subpulses is continuous and allows us to reconstruct the full wideband LFM in (1)

$$\sum_{k=0}^{K-1} s(t - kT, k) = s(t). \quad (10)$$

This is an important property that will be used to show the equivalence between WBS and the LFM case. The received signal due to a scatterer located at (x,y) can be written as $$z_{x,y}(t,m,k) = \alpha_{x,y} s(t\tau_{m,k}(x,y),k). \quad (11)$$

In (11) the two way delay term $\tau_{m,k}(x,y)$ is indexed not only by the pulse number m, but also by the subpulse number k as each of the subpulses are transmitted sequentially. The two-way delay for the FJB can be written as $$\tau_{m,k}(x,y) = \frac{2}{c}\sqrt{x^2 - (a_{m,k} - y)^2}. \quad (12)$$

$\tau_{m,0}(x,y)$ in (12) is same as $\tau_m(x,y)$ in (4), $$\tau_{m,0} = \tau_m. \quad (13)$$

In (12), (x,y) is a point on the ground. The first FJB subpulse (k=0) is transmitted at the same time/location as each of the LFM pulses, as denoted in (13). The total received data for the $(k+1)^{th}$ FJB transmit waveform is given by $$z(t,m,k) = \sum_{x,y} z_{x,y}(t,m,k) = \sum_{x,y} \alpha_{x,y} s(t - \tau_{m,k}(x,y), k) \quad (14)$$

where the received signals due to different scatters are summed together.

The previous method used by Lord, Davis, et al. (V. Murthy, U. Pillai and M. E. Davis, "Waveforms for Simultaneous SAR and GMTI," *in Proceedings of the 2012 IEEE Radar Conference*, Atlanta, Ga. May 7-11, 2012; M. Davis, "Challenges of Ultra Wideband, Multi-Mode Radar," 2011 *IEEE CIE International Conference on Radar*, vol. 1, October 2011, pp. 5-8; R. Lord and M. Inggs, "High Resolution SAR Processing Using Stepped Frequencies," IEEE IGARSS '97, 1997), consists of stitching a wideband signal by applying the appropriate phase and time shifts prior to matched filtering and imaging. Starting with the received signal in (14), we can get the time compensated signal $$\tilde{z}(t,m,k) = z(tkT,m,k). \quad (15)$$

In (15), the time compensation have aligned every $k^{th}$ subpulse for $1 \leq k \leq K-1$ to the first subpulse (k=0) in time. This compensation is true when the target is located at broadside or the distance between the platform and the target is very large. When generating the point spread function (PSF) using this method, the resulting PSF will have the same features as the LFM if is the scatterer point is located on broadside. From (15), a wideband waveform can be constructed by applying a shift of kT and summing $$z(t,m) = \sum_{k=0}^{K-1} z(t - kT, m, k) = \sum_{k=0}^{K-1} \sum_{x,y} \alpha_{x,y} s(t - \tau_{m,k}(x,y) - kT, k). \quad (16)$$

Notice that when the target is at broadside, we have $$\tau_{m,k}(x,y) = \tau_m(x,y). \quad (17)$$

Thus, (16) can be written as $$z(t,m) = \sum_{k=0}^{K-1} z(t - kT, m, k) = \sum_{x,y} \alpha_{x,y} s(t - \tau_m(x,y)). \quad (18)$$

Here we have used the property in (10) to show that (16) is equivalent to (5).

Since (18) is equivalent to (5), the range compressed data can be written as $$g(t,m) = z(t,m) \circledast h(t), \quad (19)$$

and as with the LFM, the corresponding SAR map can be obtained as $$SAR_1(\tilde{x},\tilde{y}) = \sum_{m=0}^{M-1} g(t + \tau_m(\tilde{x},\tilde{y}), m) = SAR_{LFM}. \quad (20)$$

However, when the target is not on the broadside, the synthesized wideband waveform in (16) is in the form of $$z(t,m) = \sum_{k=0}^{K-1} z(t - kT, m, k) = \sum_{k=0}^{K-1} \sum_{x,y} \alpha_{x,y} s(t - \tau_{m,k}(x,y) - kT, k). \quad (21)$$

After range compression, the SAR image we obtain is in the form of $$SAR_1(\tilde{x}, \tilde{y}) = \sum_{m=0}^{M-1} g(t + \tau_m(\tilde{x}, \tilde{y}), m) = \quad (22)$$

$$\sum_{m=0}^{M-1}\sum_{k=0}^{K-1}\sum_{x,y} \alpha_{x,y} s(t - [\tau_{m,k}(x, y) - \tau_m(\tilde{x}, \tilde{y})] - kT, k).$$

Notice that in (22), even the scatterer located at $(\tilde{x},\tilde{y})$ can not be coherently combined over the M pulses.

SUMMARY OF THE INVENTION

Simultaneous multi-mode surveillance provides enhanced situational awareness providing several concurrent data products that complement one another. Synthetic aperture radar (SAR) and ground moving target indication (GMTI) are traditionally performed separately, either on separate platforms or on a single platform employing mode switching, as they have differing requirements. Recent efforts in the field have in part concentrated on exploiting a common data source for both modalities in order to perform them simultaneously.

One or more embodiments of the present invention, use a frequency jump burst (FJB) waveform for a transmit signal for a common SAR/GMTI waveform. The FJB waveform has a narrowband transmit waveform which provides processing flexibility at the receiver. In at least one embodiment, a computer processor processes each of a plurality of subpulses comprising the FJB independently of the others for GMTI—yielding multiple looks. For SAR, the waveforms, in at least one embodiment of the present invention must be combined in some fashion to yield the expected range resolution promised by the overall transmit bandwidth. In this context, at least one embodiment of the present invention provides a new method to synthesis wideband effect using narrowband FJB waveforms without snitching the FJB waveforms first. In this method, each of the narrowband subpulse waveform is passed through a set of narrowband matched filters and then the SAR images formed using the filtered data are combined to achieve the wideband effect. One or more embodiments of the present invention increase processing flexibility and reduce computational cost.

In the FJB transmit pattern, each of the K subpulses are transmitted M times with the pulse repetition interval (PRI) Tr. Each FJB subpulse can be used independently of the other subpulses for GMTI, i.e. K GMTI looks can be obtained with the FJB. However, for SAR a higher bandwidth is required and the subpulses must be combined in some manner to yield M wideband signals.

Alternatively, instead of compensating the data to a single point and aligning subpulses k=1→K−1 with the k=0 subpulse, we have found that it is possible to individually pulse compress and image the K subpulses and then combine the individual backprojection outputs to yield a single high resolution SAR map. In at least one embodiment, the present invention includes individually pulse compressing and imaging the K subpulses of the FJB, and then summing the K low resolution SAR outputs, by using a computer processor, to yield a single high resolution SAR map, which can be displayed using a computer display Starting from equation (14), the received data for the $(k+1)^{th}$ subpulse is time delayed by kT to obtain $$z(t-kT,m,k) \quad (23)$$

and then pulse compressed $$g(t, m, k) = \sum_{i=0}^{K-1} z(t - kT, m, k) \circledast h\, t_i(i) \quad (24)$$

-continued $$= \sum_{i=0}^{K-1}\sum_{x,y} s(t - \tau_{m,k}(x, y) - kT, k) \circledast h(t, i),$$

where $$h(t,i)=s^*(-t-iT,i), \; 0 \le K \le 1. \quad (25)$$

This is equivalent to applying a single wideband matched filter h(t) as $$g(t,m,k)=z(tkT,m,k) \circledast h(t) \quad (26)$$

since $$\sum_{i=0}^{K-1} h(t, i) = h(t). \quad (27)$$

Using (26), each of the K subpulses can be imaged individually yielding $$SAR_{FJB}(\tilde{x}, \tilde{y}, k) = \quad (28)$$

$$\sum_{m=0}^{M-1} g(t + \tau_{m,k}(\tilde{x}, \tilde{y}), m, k) = M\alpha_{\tilde{x},\tilde{y}}s(t-kT,k)\circledast h(t) +$$

$$\sum_{m=0}^{M-1}\sum_{\substack{x,y \\ (x,y)\ne(\tilde{x},\tilde{y})}} \alpha_{x,y} s(t-[\tau_{m,k}(x,y)-\tau_{m,k}(\tilde{x},\tilde{y})]-kT,k)\circledast h(t)$$

which when summed over all K subpulses produces the desired image $$SAR_{FJB}(\tilde{x}, \tilde{y}) = \sum_{k=0}^{K-1} SAR_{FJB}(\tilde{x}, \tilde{y}, k) = M\alpha_{\tilde{x},\tilde{y}}s(t)\circledast h(t) + \quad (29)$$

$$\sum_{m=0}^{M-1}\sum_{k=0}^{K-1}\sum_{\substack{x,y \\ (x,y)\ne(\tilde{x},\tilde{y})}} \alpha_{x,y} s_k(t - kT - [\tau_{m,k}(x, y) - \tau_{m,k}(\tilde{x}, \tilde{y})])\circledast h(t).$$

Notice that when compared with the SAR image formed using LFM waveform, a method in accordance with one or more embodiments of the present invention, has the same mainlobe structure where the scatterer located at the image point $(\tilde{x},\tilde{y})$ is coherently combined over all M pulses. However, the sidelobe term is slightly different than the LFM result. The sidelobe difference between the LFM image and the image obtained using a method in accordance with one or more embodiments of the present invention, is minimum and it can be seen from the simulation result below.

Indeed, one or more embodiments of the present invention allow reconstruction of a SAR image for any arbitrary set of waveforms that together comprise a longer waveform. That is, if any arbitrary waveform is split into multiple segments and transmitted, one or more embodiments of the present invention provide a method for reconstituting a SAR image that is highly similar to a SAR image obtained using the original waveform.

For the case of a long, wideband or ultra wideband LFM signal, splitting the signal into segments produces lower bandwidth LFM waveforms called subpulses at different carrier frequencies. If these subpulses are then used to collect or simulate data, one or more embodiments of the present invention provide a method for obtaining a SAR image that has identical resolution properties and highly similar sidelobe characteristics to the SAR image obtained had the original LFM signal been used. Effectively, one or more embodiments of the present invention provide a final output with the mainlobe characteristics commensurate with a full bandwidth return from each of the scatterers imaged.

In at least one embodiment of the present application a method is provided. For the implementation of the method, each of variables k and m starts out at with a value of zero. The method may include the steps of transmitting $(k+1)^{th}$ subpulse of $(m+1)^{th}$ pulse of a transmit signal from a transmitter, wherein the transmit signal includes M pulses and wherein each of the M pulses has K subpulses, wherein each of M and K are positive integers; receiving a return signal due to the $(k+1)^{th}$ subpulse of the $(m+1)^{th}$ pulse of the transmit signal at a receiver; and supplying a filter input signal for the $(k+1)^{th}$ subpulse of the $(m+1)^{th}$ pulse, which is based on the return signal due the $(k+1)^{th}$ subpulse of the $(m+1)^{th}$ pulse, to a plurality of filter inputs of a corresponding plurality of filters.

The method may further include the steps of using the plurality of filters to produce a corresponding plurality of filter output signals for the $(k+1)^{th}$ subpulse of the $(m+1)^{th}$ pulse, at a corresponding plurality of filter outputs; combining the plurality of filter output signals for the $(k+1)^{th}$ subpulse of the $(m+1)^{th}$ pulse to produce a combination filtered signal for the $(k+1)^{th}$ subpulse of the $(m+1)^{th}$ pulse; supplying the combination filtered signal for the $(k+1)^{th}$ subpulse of the $(m+1)^{th}$ pulse to a synthetic aperture radar processor; and using the synthetic aperture radar processor to produce a coarse range/cross range resolution synthetic aperture radar map for the combination filtered signal for the $(k+1)^{th}$ subpulse of the $(m+1)^{th}$ pulse of the transmit signal.

The method may further include incrementing k, and then repeating the above steps, until k equals the number K.

The method may further include incrementing m, restarting k at a value of zero, and then repeating the above steps, until m equals the number M.

The above steps may produce a plurality of coarse range/cross range resolution synthetic aperture radar maps, one coarse range/cross range resolution synthetic aperture radar map for each subpulse of each pulse of the transmit signal. The method may further include combining the coarse range/cross range resolution synthetic aperture radar maps for the $i^{th}$ subpulses of all M pulses, for i=1 to K, to produce K coarse range resolution synthetic radar aperture maps; and combining the K coarse range resolution synthetic radar aperture maps to produce a final combined map.

The transmit signal may be a frequency jump burst-type waveform. The variable M may be equal to 1 for the above method.

The step of using the synthetic aperture radar processor to produce the coarse range/cross range resolution synthetic aperture radar map for the combination filtered signal for the $(k+1)^{th}$ subpulse of the $(m+1)^{th}$ pulse of the transmit signal; and the step of combining the $i^{th}$ subpulses of all M pulses, for i=1 to K, to produce K coarse range resolution synthetic radar aperture maps may be performed at the same time.

The step of using the synthetic aperture radar processor to produce the coarse range/cross range resolution synthetic aperture radar map for the combination filtered signal for the $(k+1)^{th}$ subpulse of the $(m+1)^{th}$ pulse of the transmit signal; the step of combining the $i^{th}$ subpulses of all M pulses, for i=1 to K, to produce K coarse range resolution synthetic radar aperture maps; and the step of combining the K coarse range resolution synthetic radar aperture maps to produce the final combined map may be performed at the same time.

The steps shown above may be implemented by a computer processor. The return signal, the plurality of filter input signals, the plurality of filter output signals, the combination filtered signal, and the coarse range/cross resolution synthetic aperture radar map for each of the K subpulses of each of the M pulses, may be stored in a computer memory by the computer processor. The K coarse range resolution synthetic radar aperture maps, and final combined map, may be stored in the computer memory by the computer processor.

At least one embodiment of the present invention may include an apparatus comprising a transmitter, a receiver, a computer processor; and a computer memory. The computer processor may be programmed by a computer program to execute a sequence of operations in accordance with the method as previously described.

BRIEF DESCRIPTION OF THE DRAWINGS

FIG. 10 shows a flow chart of a method in accordance with an embodiment of the present invention.

DETAILED DESCRIPTION OF THE DRAWINGS

Figure 1:
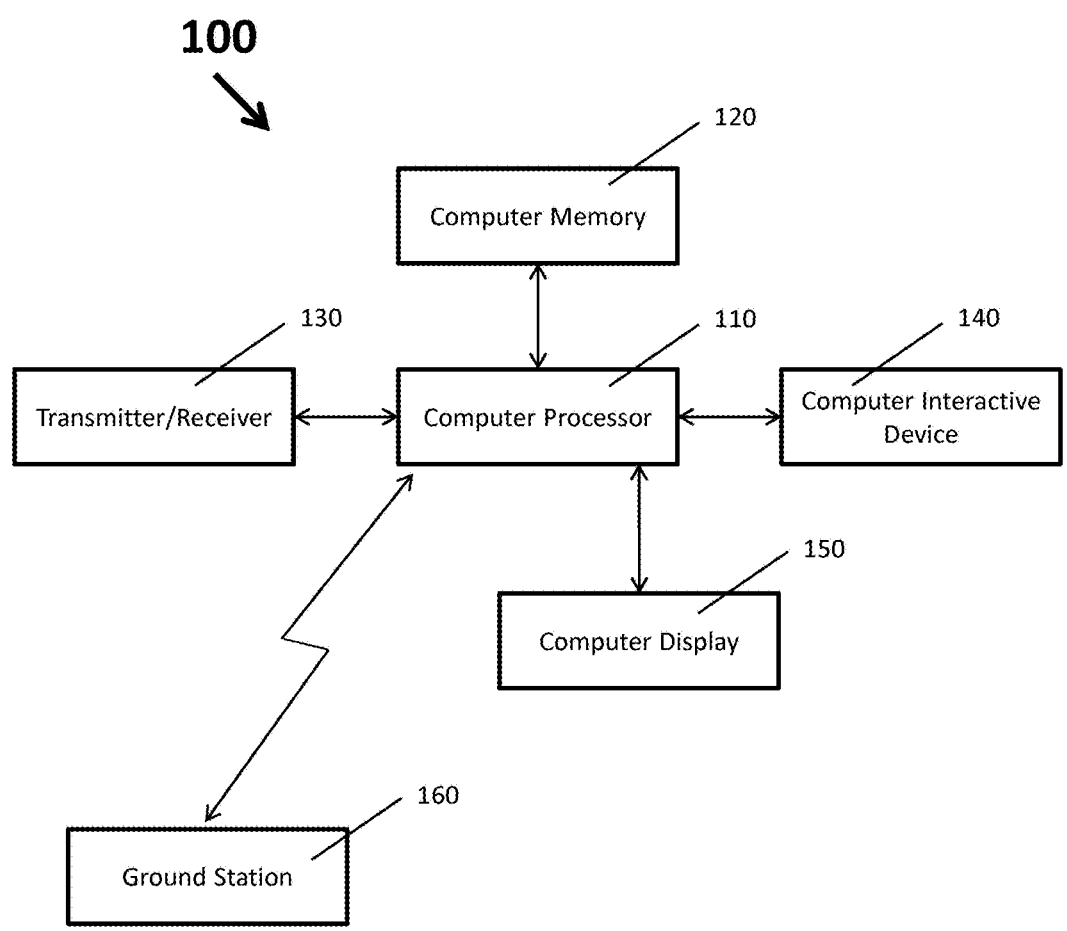
FIG. 1 shows a block diagram of an onboard apparatus and a ground station in accordance with an embodiment of the present invention, wherein the onboard apparatus may be located in a handheld device, which may communicate with the ground station.

FIG. 1 shows a block diagram of an apparatus 100 in accordance with an embodiment of the present invention and of a ground station 160 to which the apparatus 100 communicates. The apparatus 100 includes a computer memory 120, a computer processor 110, a transmitter/receiver 130, a computer interactive device 140, a computer display 150. The transmitter/receiver 130 may include a plurality of transmitter devices and a plurality receiver devices. Each receiver device of the plurality of receiver devices of the transmitter/receiver 130 may be spaced apart from every other receiver device of the transmitter/receiver 130. The apparatus 100 may communicate with the ground station 160 through a data link in order to relay the data measured by the transmitter/receiver 130 or data processed by the on-board processor 110. The data link may be implemented by a transmitter/receiver such as 130 or by another transmitter/receiver of by some other mechanism such as a tactical data link system. The computer memory 120, the transmitter/receiver 130, the computer interactive device 140, the computer display 150 and the ground station 160 may communicate with and may be connected by communications links to the computer processor 110, such as by hardwired, wireless, optical, and/or any other communications links. The apparatus 100 may be part of or may be installed on any computer, such as a personal computer, a handheld portable computer device, such as a tablet computer, laptop computer, or portable smart phone.

The transmitter/receiver 130 may be a radar or transmitter/receiver or a plurality of radio frequency transmitter/receivers.

Figure 2:
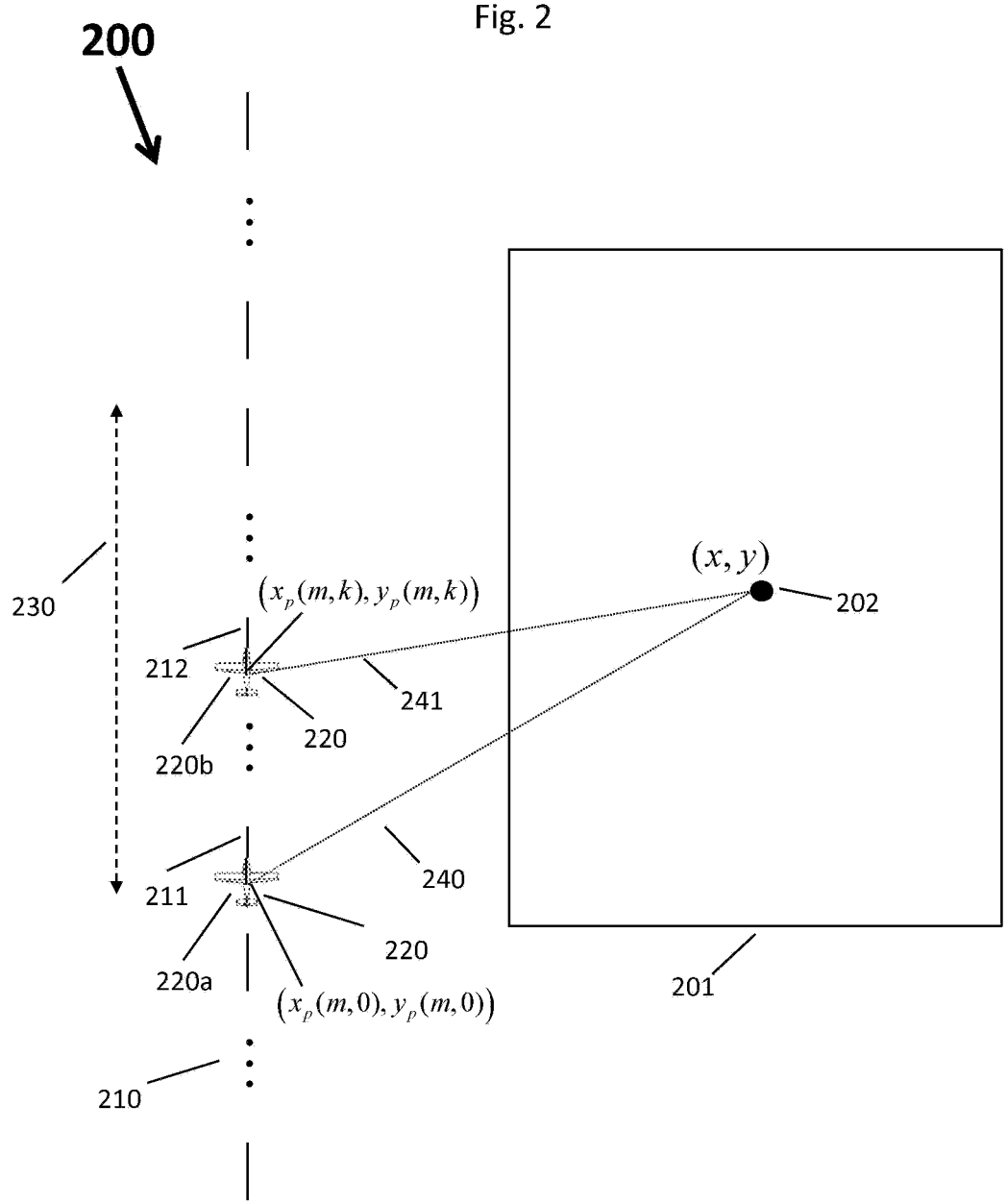
FIG. 2 illustrates measurement geometry for strip mapmode SAR/GMTI with a platform flying along its flight path measuring data from a geographic region.

FIG. 2 illustrates a diagram 200. The diagram 200 depicts a platform, such as an airplane 220 flying along a flight path 210 measuring data from a geographic region 201. The platform includes the apparatus 100. The airplane or platform 220 is also identified as 220a when it is at the location of $(x_p(m,0), y_p(m,0))$ at time $t_{m,0}=mKTr$, when the first subpulse of the $(m+1)^{th}$ pulse is transmitted. The airplane or platform 220 is also identified as 220b when it is at the location $(x_p(m,k), y_p(m,k))$ at time $t_{m,k}=(mKk)Tr$, when the $(k+1)^{th}$ subpulse of $(m+1)^{th}$ pulse is transmitted from the transmitter/receiver 130. The flight path 210 illustrated corresponds to well known conventional strip-map measurement geometry as discussed in M. Soumekh, *Synthetic Aperture Radar Signal Processing with Matlab Algorithms*, Wiley, 1999. This imaging geometry is one possibility for measuring data. Other geometries such as circular, scan or spotlight may also be used (Ian G. Cumming and Frank H. Wong. *Digital Processing of Synthetic Aperture Radar Data: Algorithms and Implementation*. Artech House Publishers, January 2005). The distance 240 from the transmitter/receiver 130, of the apparatus 100, on the platform 220, identified as 220a at time $t_{m,0}$, located at $(x_p(m,0), y_p(m,0))$, at the time of transmitting a subpulse 211 from the transmitter/receiver 130 of the apparatus 100 of the $(m+1)^{th}$ pulse 230 to a point (x, y) 202 in the geographic region or scene 201 is given by $$r_{m,0}(x,y)=\sqrt{(x_p(m,0)-x)^2+(y_p(m,0)-y)^2}, \quad (30)$$

and the corresponding two-way delay, for that time it takes a signal transmitted from transmitter/receiver 130 to come back to 130 after impacting point 202 for that distance 240 is $\tau_{m,0}(x,y)=2r_{m,0}(x,y)/c$ where c is the speed of light. Similarly, the distance 241 between the point 202 and the transmitter/receiver 130 of the apparatus 100 on the platform 220, identified as 220b at time $t_{m,k}$, located at $(x_p(m,k), y_p(m,k))$ at the time of transmitting the $(k+1)^{th}$ subpulse 212, from the transmitter/receiver 130 of the apparatus 100 of the $(m+1)^{th}$ pulse 230 is given by $$r_{m,k}(x,y)=\sqrt{(x_p(m,k)-x)^2+(y_p(m,k)-y)^2}, \quad (31)$$

and the corresponding two way delay for the time it takes a signal transmitted from the transmitter/receiver 130 at 220b to come back to transmitter/receiver 130 after impacting with point 202 is $\tau_{m,k}(x,y)=2r_{m,k}(x,y)/c$. For each of the $0 \leq m \leq M-1$ pulses there are K subpulses.

Figure 3:
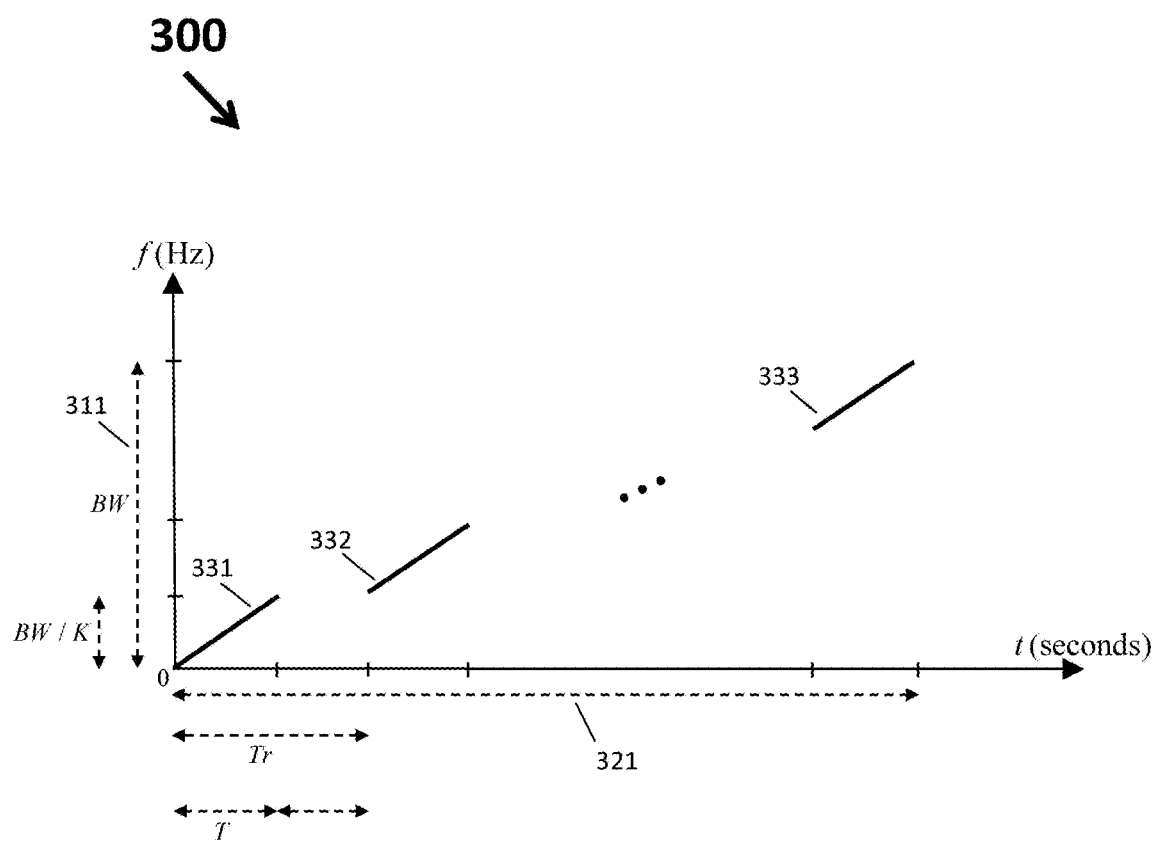
FIG. 3 illustrates transmit signal pattern for a waveform in a single input multiple output (SIMO) system.

FIG. 3 illustrates a diagram 300 of a transmit signal pattern, for a signal to be transmitted from the transmitter/receiver 130, for a waveform in a single input multiple output (SIMO) system. The diagram 300 depicts the first 331, second 332 and the last 333 subpulses of a waveform with K subpulses during one pulse duration 321. The f axis represents frequency in Hertz (Hz.). The t axis represents time in seconds. The one pulse (which includes subpulses 331-333, and subpulses in between 332 and 333) of the transmit waveform referred to by FIG. 3 covers a predefined bandwidth BW, which may be stored in the computer memory 120. During a subpulse duration T each subpulse (of subpulses 331-333, and those in between 332 and 333) of the waveform referred to in FIG. 3, covers a bandwidth BW/K label as BW/K. The transmission of the second subpulse, 332, starts Tr seconds later than the start of transmission of the first subpulse, 331. Each subpulse (of 331, 332, 333, and those in between 332 and 333) is separated from adjacent subpulses, in time, by a constant duration Tr−T. Computer processor 110 transmits each subpulse of 331, 332, 333, and subpulses in between 332 and 333, if any, serially as described in diagram 300 via a transmitter of transmitter/receiver 130 of the apparatus 100 and repeats the same sequence. The transmit waveform may be a Frequency Jump Burst (FJB) which may be in the form of equation (8). The example waveform in equation (8) has the property of continuous phase between subpulses and allows one or more embodiments of the present invention to reconstruct the wideband LFM signal in equation (1) as in equation (10). At the transmitter/receiver 130, each subpulse of the FJB waveforms is transmitted during the duration T. The transmitter/receiver 130 collects the returning echoes during the duration $T_r$−T immediately after transmission. The received signal (returning echoes) may be in the form of equation (14).

Figure 4:
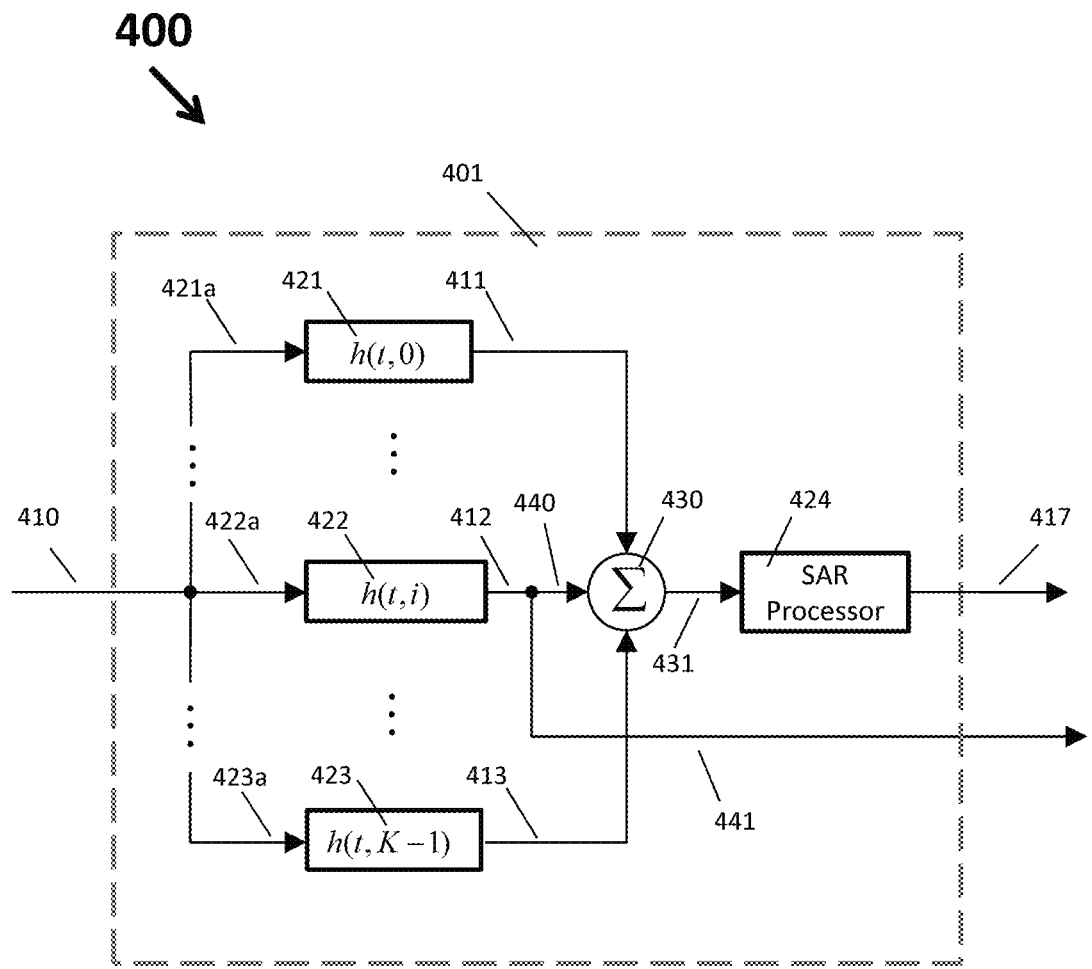
FIG. 4 shows a flow diagram of a method, system, and/or apparatus to achieve a low resolution SAR image and GMTI output from any one subpulse of a received signal.

FIG. 4 shows a high level flow diagram 400 of an apparatus, system and/or method 401 in accordance with an embodiment of the present invention for obtaining coarse range resolution SAR images and pulse-compressed data ready for GMTI. The apparatus, system and/or method 401 may be implemented by the computer processor 110 through a computer program stored in computer memory 120.

The apparatus, system and/or method 401 may receive a delayed version of the received signal z(t,m,k) for the $k^{th}$ subpulse as referred to in equation (14), at an input 410 of apparatus, system and/or method 401. The received signal z(t,m,k) may be received by a receiver of transmitter/receiver 130 of the apparatus 100. The received signal z(t,m,k) may be stored in the computer memory 120 by the computer processor 110. The signal at the input 410 may be a delayed or modified version signal z(t,m,k), wherein z(t,m,k) is delayed by kT by the computer processor 110 by use of equation (23) to obtain a delayed or modified version of signal z(t,m,k). The delayed or modified version of signal z(t,m,k) may be stored in the computer memory 120 by the computer processor 110. The time delayed signal, i.e. the signal $\tilde{z}(t,m,k)$ as in equation (15), at input 410 may then be supplied to a set of matched filters 421, 422 and 423. Each of the set of matched filters 421, 422, and 423 may be implemented by the computer processor 110, and may be determined and/or defined by one or more computer programs stored in the computer memory 120. The matched filter 421, implemented by computer processor 110, is a matched filter corresponding to the first subpulse 331 as in equation (25) with i=0. The matched filter 422, implemented by the computer processor 110, is a matched filter corresponding to the $i^{th}$ subpulse (of the subpulses 331, 332, 333, and any subpulses in between 332 and 333), and the matched filter 423 is a matched filter corresponding to the $K^{th}$ subpulse as in equation (25). The matched filter 421 has an output 411, at which is provided a filtered version of the modified z(t,m,k) signal by the matched filter 421 convolving the modified z(t,m,k) signal to provide a first filtered modified z(t,m,k)

signal at output 411. The matched filter 422 has an output 412, at which is provided a filtered version of the modified z(t,m,k) signal by the matched filter 422 convolving the modified z(t,m,k) to provide a second filtered modified z(t,m,k) signal at the output 412. The first filtered modified z(t,m,k) signal at output 411 differs from the second filtered modified z(t,m,k) signal at output 412 because the filter 421 as in equation (25) with i=0 and filter 422 as in equation (25) with i≠0 or K−1 are different as they are matched to different subpulses. The signal provided at the output 412 is sent to input 440 of summation device 430, and to output 441.

The matched filter 423 has an output 413, at which is provided a third filtered version of the modified z(t,m,k) signal by convolving the modified z(t,m,k) by the matched filter 423, The first filtered modified z(t,m,k) signal at output 411, the second filtered modified z(t,m,k) signal at output 412, and the third filtered modified z(t,m,k) signal at output 413 are different from each other because each of the filters 421, 422, and 423 as in equation (25) with i=0, i≠0 or K−1 and i=K 1 respectively are different as they are matched to different subpulses.

The third filtered version of the modified z(t,m,k) signal provided at output 413 is a signal at output 413 corresponding to supplying the $k^{th}$ subpulse provided at input 410 in FIG. 4 to the $K^{th}$ matched filter 423.

After filtering, the signals at outputs 411, 412 and 413 are supplied as inputs to summation device or block 430 which combines the signals at 411, 412, and 413 by adding using equation (24) to form a combined signal g(t,m,k), which may be stored in computer memory 120 by the computer processor 110. The summation device 430 may be implemented by the computer processor 110 as programmed by a computer program stored in the computer memory 120. The combined signal g(t,m,k) at output 431 of the summation device 430 is then sent to a SAR processor 424 which may be implemented by the computer processor 110 in accordance with a computer program stored in the computer memory 120, and a resulting coarse range resolution SAR map is produced by the computer processor 110 at output 417 and may be displayed on the computer display 150 and/or stored in the computer memory 120. This series of operations implemented by the computer processor 110 for the apparatus, system, and/or method 401 is repeated K times, over M pulses. For a given k, the signal z(t,m,k) for all M pulses will go into 401 and give two output signals at outputs 417 and 441. Then the SAR processor 424 will combine the signal 431 due to all M pulses for that k to give a combined signal at output 417 using equation (28). The output signal 441 due to all M pulses are then sent to GMTI processor 520 as in FIG. 5. The whole processing is then repeated K times as shown in FIG. 5.

Figure 5:
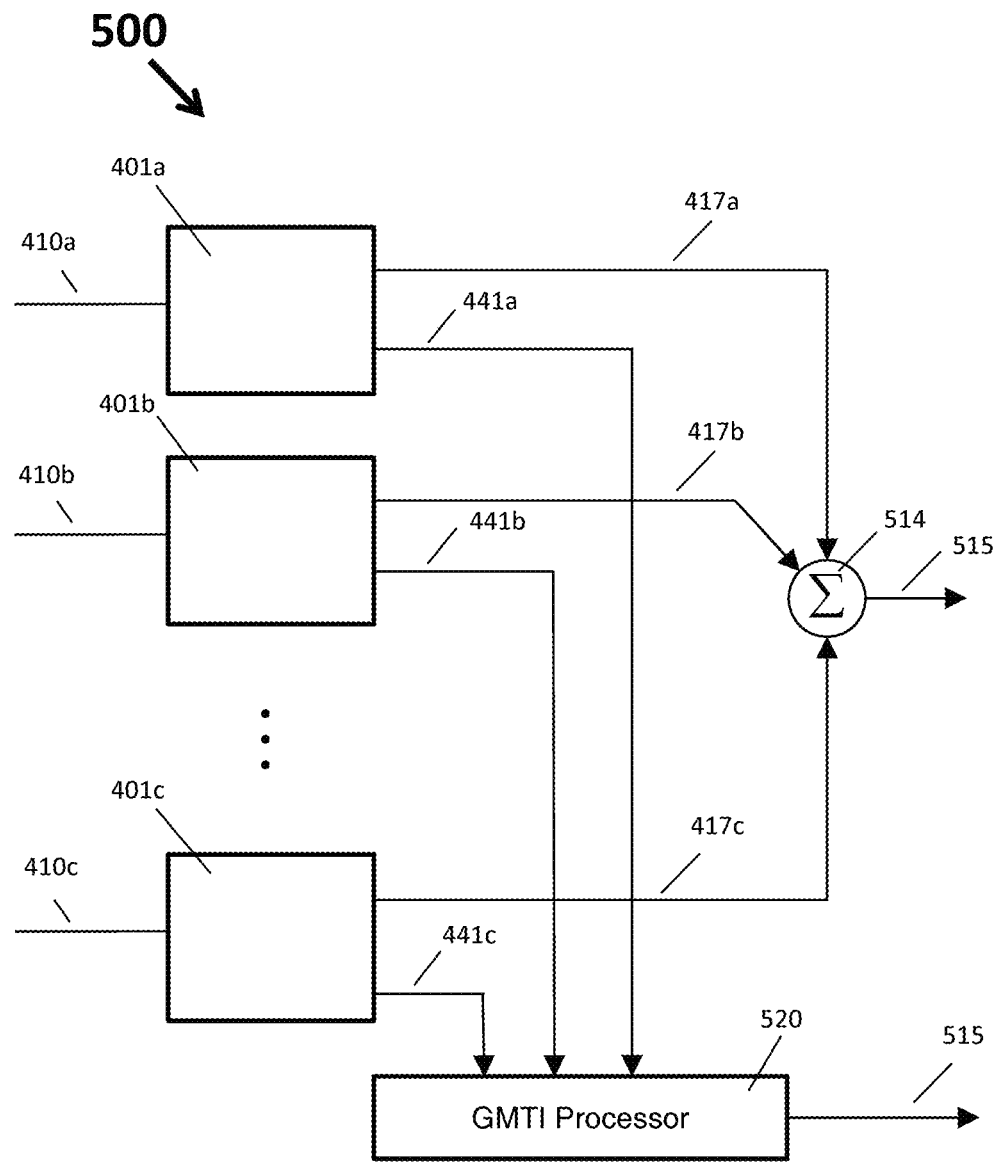
FIG. 5 shows the flow diagram of a method to achieve wideband-high resolution SAR and multiple GMTI output from a plurality of received signals.

FIG. 5 shows a flow diagram 500 illustrating how to obtain high resolution SAR image and narrowband data from GMTI processing. The diagram 500 shows blocks 401*a*, 401*b*, and 401*c*, and there may be a plurality of blocks in between 401*b* and 401*c*. Each of blocks 401*a*, 401*b*, and 401*c*, may be identical to apparatus, system, and/or method 401 shown in FIG. 4. The blocks 401*a*, 401*b*, and 401*c* are shown as different blocks because different signals are applied to different blocks of 401*a-c*. The block 401*a* has an input 410*a* at which may be supplied signal z̃(t,m,0) as in equation (15). The block 401*b* has an input 410*b* at which may be supplied signal z̃(t,m,1) as in equation (15). The block 401*c* has an input 410*c* at which may be supplied signal z̃(t,m,K).

The block 401*a* has an output 417*a* at which is produced a coarse range resolution SAR image using equation (28) with k=0 using the return data corresponding to the first subpulse 331 shown in FIG. 3. The block 401*b* has an output 417*b* at which may be produced a coarse range resolution SAR image using equation (28) with k=1 using the received data corresponding to the second subpulse 332 shown in FIG. 3. The block 401*c* has an output 417*c* at which may be produced a coarse range resolution SAR image using equation (28) with k=K 1 using the received data corresponding to the $K^{th}$ subpulse 333 shown in FIG. 3. Coarse range SAR images produced at outputs 417*a-c* are supplied to summation device 514. The summation device 514 adds the coarse range resolution SAR images provided at outputs 417*a-c* using equation (29) and produces a fine range resolution SAR image at output 515. The summation device 514 may be implemented by the computer processor 110 by a computer program stored in the computer memory 120. The signals and/or images at inputs 410*a-c*, and outputs 417*a-c*, and at output 515 may be stored in computer memory 120 by the computer processor 110 in accordance with a computer program stored in the computer memory 120.

The block 401*a* has an output 441*a* at which is produced a filtered version of z̃(t,m,0) using equation (15) with k=0 by matched filter h(t,0) using equation (25) with i=0. The block 401*b* has an output 441*b* at which may be produced a filtered version of z̃(t,m,1) using equation (15) with k=1 by matched filter h(t,1) using equation (25) with i=1. The block 401*c* has an output 441*c* at which may be produced a filtered version of z̃(t,m,K−1) using equation (15) with k=K 1 by matched filter h(t,K−1) using equation (25) with i=K 1. The signals produced at outputs 441*a-c* are supplied to GMTI processor 520. The GMTI processor 520 uses the signals 441*a*, 441*b* and 441*c* to perform ground moving target indication and produces a signal at the output 515. The GMTI Processor device 520 may be implemented by the computer processor 110 by a computer program stored in the computer memory 120. Thus using processing blocks 401*a-c*, which may be implemented by the computer processor 110 by a computer program stored in the computer memory 120 SAR images are obtained, data corresponding to different subpulses are obtained, and the SAR images and data corresponding to different subpulses can be stored in the computer memory 120 and used for GMTI processing.

When a signal is received at inputs 410*a-c* (or a delayed version thereof) as a result of a transmit signal having an FJB waveform, transmitted out from transmitter/receiver 130 of the apparatus 100 the fine range SAR image produced at the output 515 will have a range resolution K times finer than the range resolutions of the coarse range resolution images produced at outputs 417*a-c* if each of these images have equal range resolutions and the bandwidths of the corresponding waveforms supplied at inputs 410*a*-410*c* are non-overlapping. The image produced at the output 417*a* is the coarse range resolution SAR image corresponding to the first subpulse 331 shown in FIG. 3, supplied at the input 410*a*; the image produced at the output 417*b* is the coarse range resolution SAR image corresponding to the second subpulse 332 shown in FIG. 3 supplied at the input 410*b*; and the image produced at the output 410*c* is the coarse range resolution SAR image corresponding to the $K^{th}$ subpulse 333 shown in FIG. 3 supplied at the input 410*c*. Each of the signals produced at the outputs 441*a*, 441*b*, and 441*c*, may be individual narrowband pulse compressed signals. The signals produced at the outputs 441*a*-441*c* may be supplied to GMTI Processor 520 and can be used independently or combined to produce either multiple GMTI output signals or a single GMTI output signal at the output 515. The signal produced at the output 441*a* is a narrowband pulse compressed output corresponding to the first subpulse 331 shown in FIG. 3, supplied at the input 410*a*; the signal produced at the output 441*b* is a narrowband pulse compressed output corresponding to the second subpulse 332 shown in FIG. 3, supplied at the input 410*b*; and the signal produced at the output 441*c* is a narrowband pulse compressed output corresponding to the $K^{th}$ subpulse 333 shown in FIG. 3, supplied at the input 410*c*.

Figure 6A:
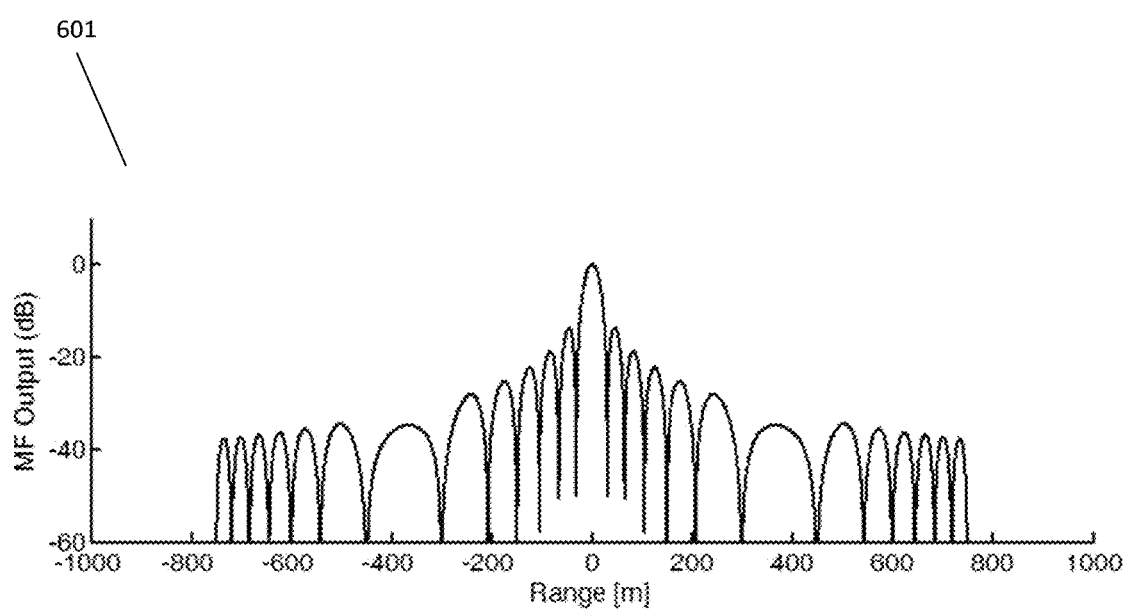
FIGS. 6A, 6B, 6C, 6D, 6E, 6F, 6G, 6H, and 6I illustrate examples of FJB waveforms when a received or delayed signal is supplied to and filtered by the bank of filters shown in FIG. 4.

FIGS. 6A-I illustrate the matched filter outputs for a 25 MHz (Megahertz) FJB waveform for a signal transmitted by transmitter/receiver 130 of the apparatus 100 with three subpulses 331, 332, and 333 supplied to the matched filters 421, 422 and 423 in FIG. 4. FIG. 6A shows diagram 601 which shows the output produced from the first filter 421 at output 411 from supplying the first subpulse 331 to input 421*a* of the first filter 421. In FIG. 6A, the y axis shows the matched filter output signal at output 411 in dB (decibels) and the x axis shows the range or distance of the transmitter/receiver 130 on the platform 220 of FIG. 2 from the target or point 202 in meters.

Figure 6B:
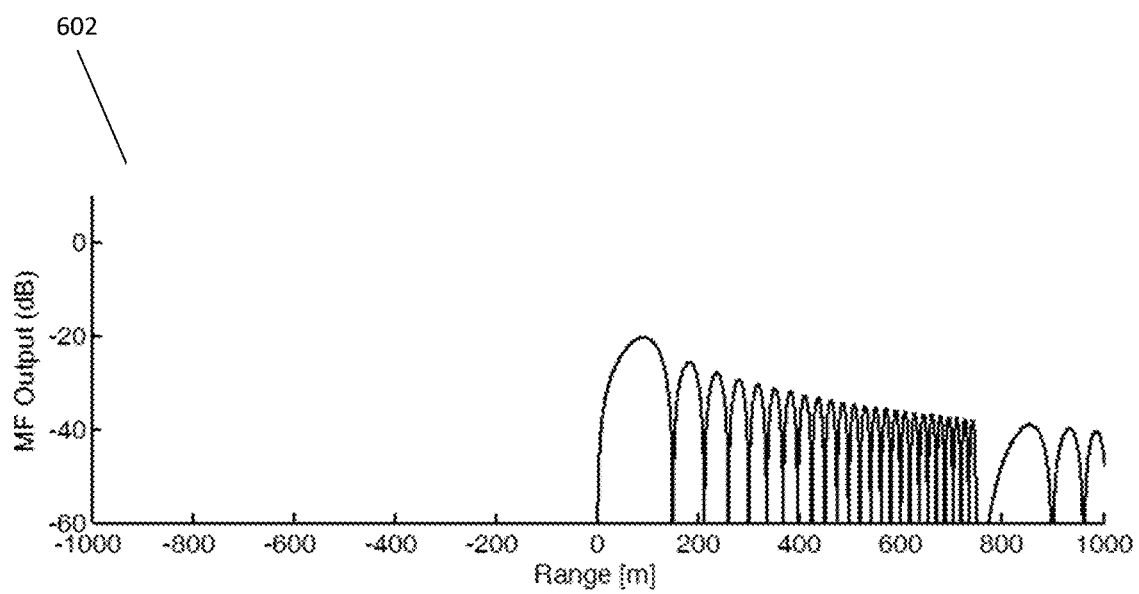

FIG. 6B shows diagram 602 which shows the output at matched filter output 412 in dB on the y axis from supplying the second subpulse 332 shown in FIG. 3, at input 421*a* to the first filter 421 versus the range or distance of the transmitter/receiver 130 on the platform 220 of FIG. 2 from the target or point 202 in meters.

Figure 6C:
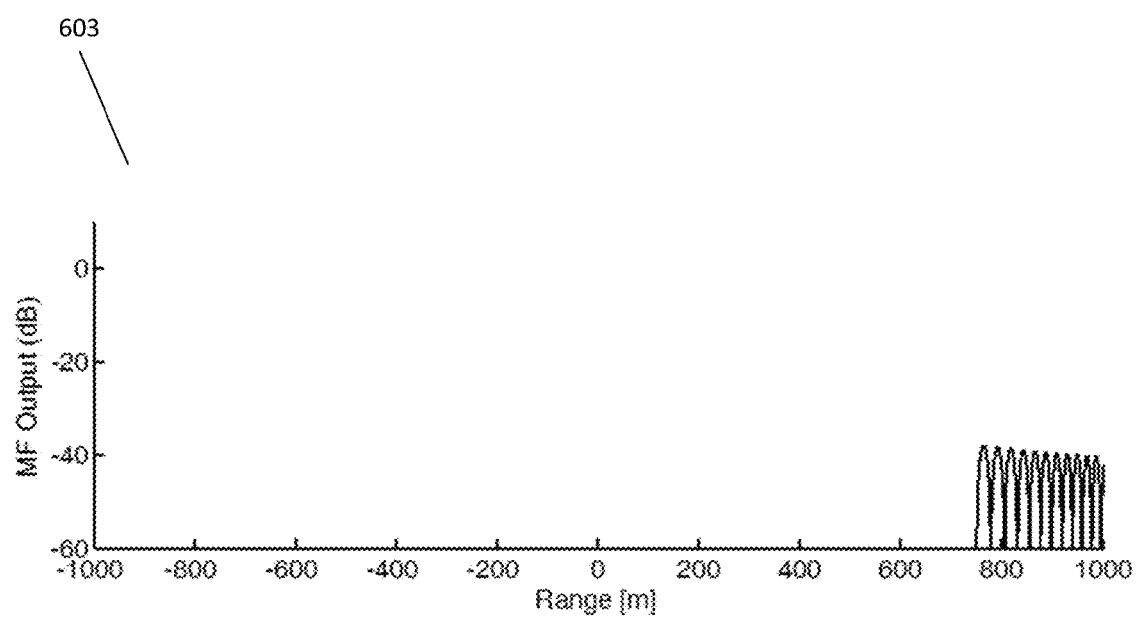

FIG. 6C shows a diagram 603 which shows the output in dB at output 411 from supplying the third subpulse 333 at the input 421*a* of the first filter 421 versus the range or distance of the transmitter/receiver 130 on the platform 220 of FIG. 2 from the target or point 202 in meters.

Figure 6D:
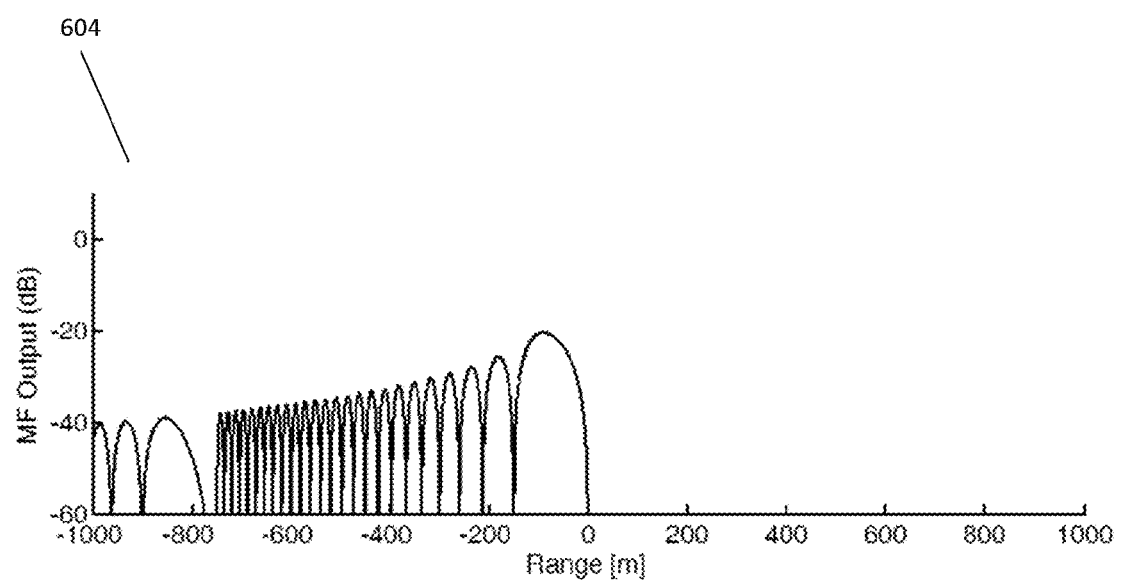

FIG. 6D shows a diagram 604 which shows the output in dB at output 412 from supplying the first subpulse 331 at the input 422*a* of the second filter 422 shown in FIG. 4 versus the range or distance of the transmitter receiver 130 on the platform 220 of FIG. 2 from the target or point 202 in meters.

Figure 6E:
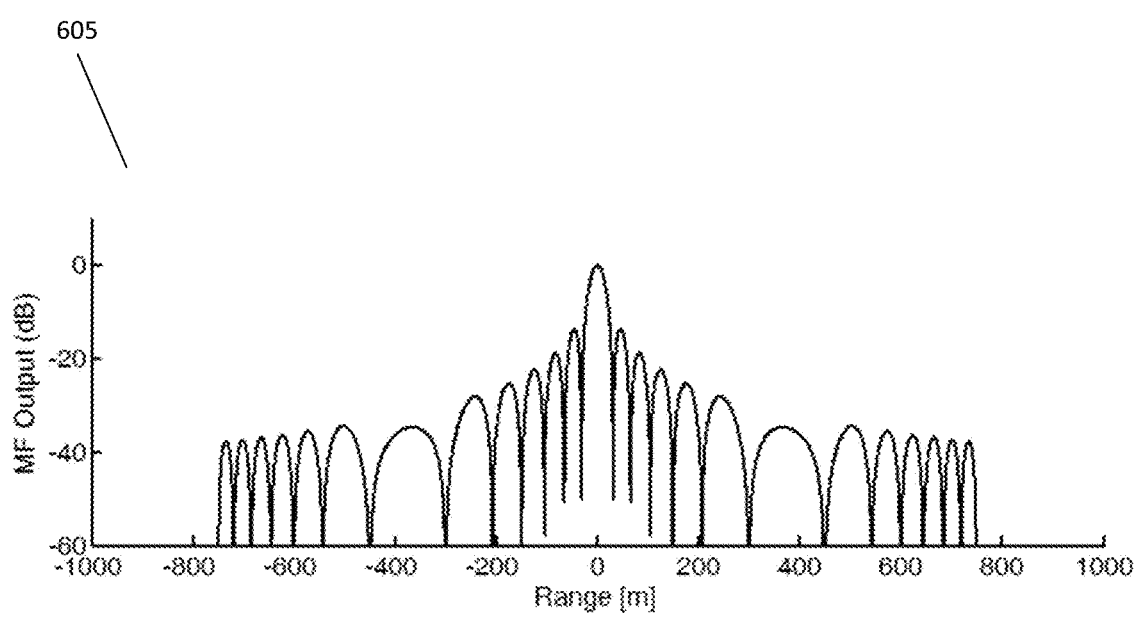

FIG. 6E shows a diagram 605 which shows the output signal in dB at output 412 from supplying the second subpulse 332 to the input 422*a* of the second filter 422 versus the range or distance of the transmitter receiver 130 on the platform 220 of FIG. 2 from the target or point 202 in meters.

Figure 6F:
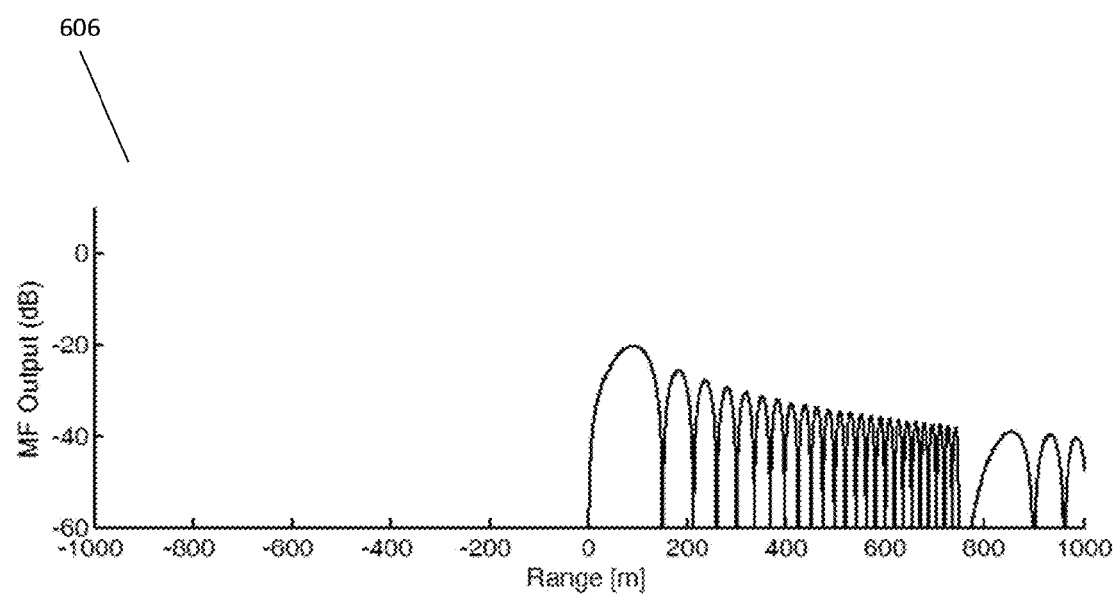

FIG. 6F shows a diagram 606 which shows the output signal in dB at output 412 from supplying the third subpulse 333 to the input 422*a* of the second filter 422 versus the range or distance of the transmitter receiver 130 on the platform 220 of FIG. 2 from the target or point 202 in meters.

Figure 6G:
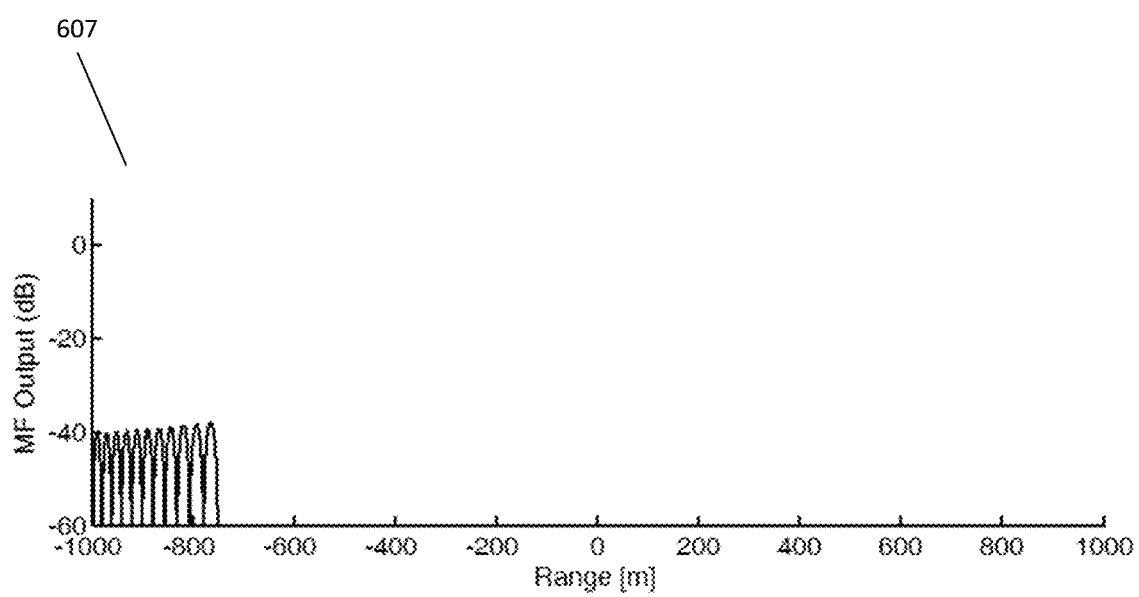

FIG. 6G shows a diagram 607 which shows the output signal in dB at the output 413 from supplying the first subpulse 331 to the third filter 423 versus the range or distance of the transmitter receiver 130 on the platform 220 of FIG. 2 from the target or point 202 in meters.

Figure 6H:
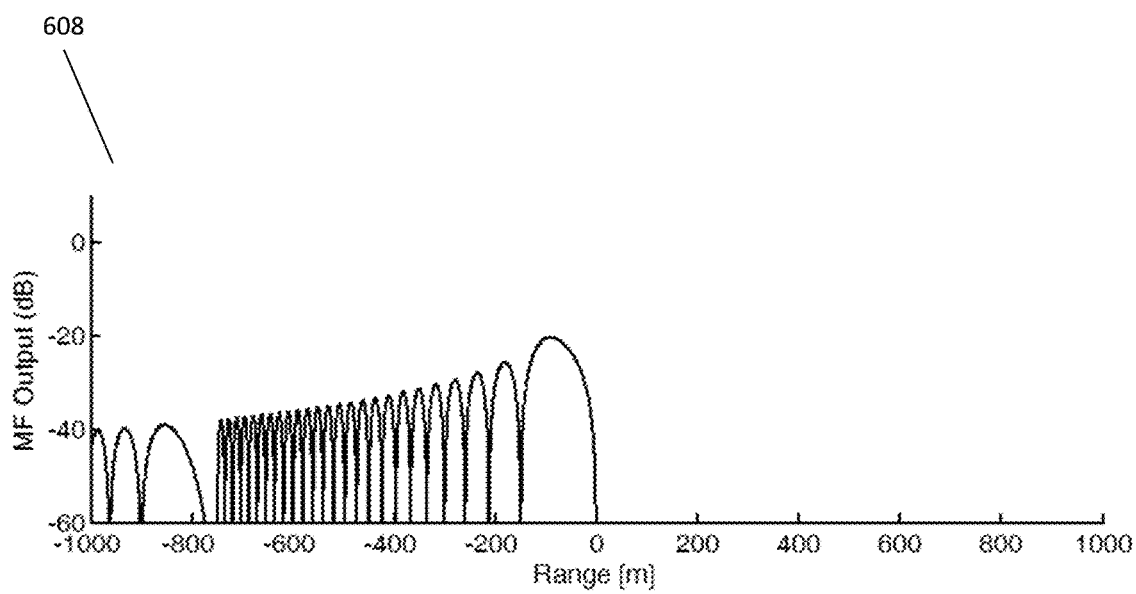

FIG. 6H shows a diagram 608 which shows the output signal in dB at the output 413 from supplying the second subpulse 332 to the third filter 423 versus the range or distance of the transmitter receiver 130 on the platform 220 of FIG. 2 from the target or point 202 in meters.

Figure 6I:
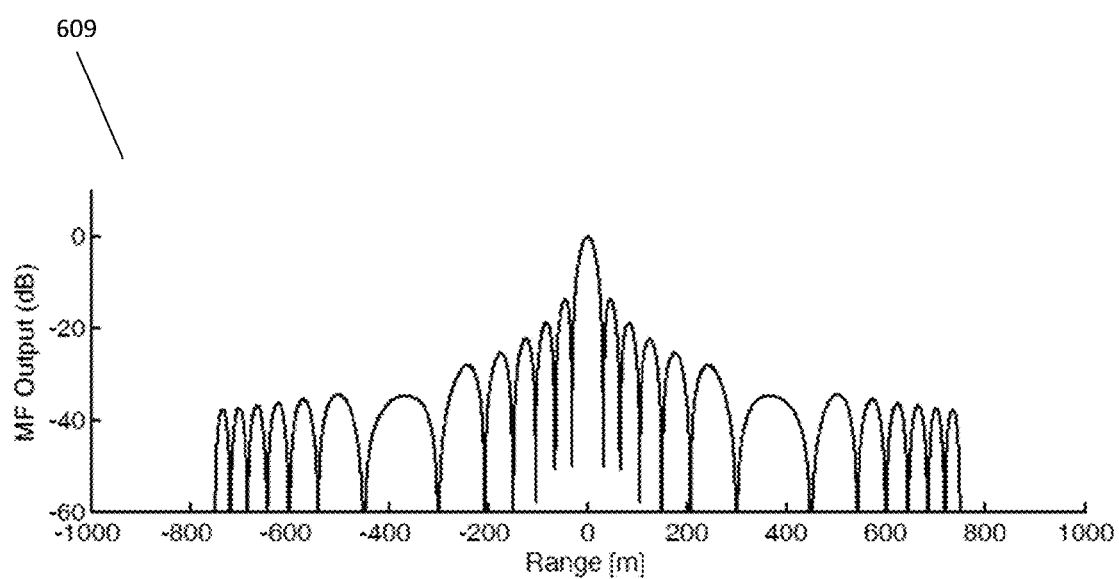

FIG. 6I shows a diagram 609 which shows the output signal in dB at output 413 from supplying the third subpulse 333 to the input 423*a* of the third filter 423 versus the range or distance of the transmitter receiver 130 on the platform 220 of FIG. 2 from the target or point 202 in meters.

The summation of the signals shown by diagrams 601, 604 and 607 by the computer processor 110 as implemented by a computer program stored in the computer memory 120 yields the combined signal at output 431 of the summation device 430 for the first subpulse 331. The summation of the signals shown by the diagrams 602, 605 and 608 by the computer processor 110 as implemented by a computer program stored in the computer memory 120 yields a combined signal at the output 431 of the summation device 430 for the second subpulse 332. The summation the signals shown by diagrams 603, 606 and 609 by the computer processor 110 as implemented by a computer program stored in the computer memory 120 yields the combined signal at the output 431 for the last subpulse 333.

Figure 7A:
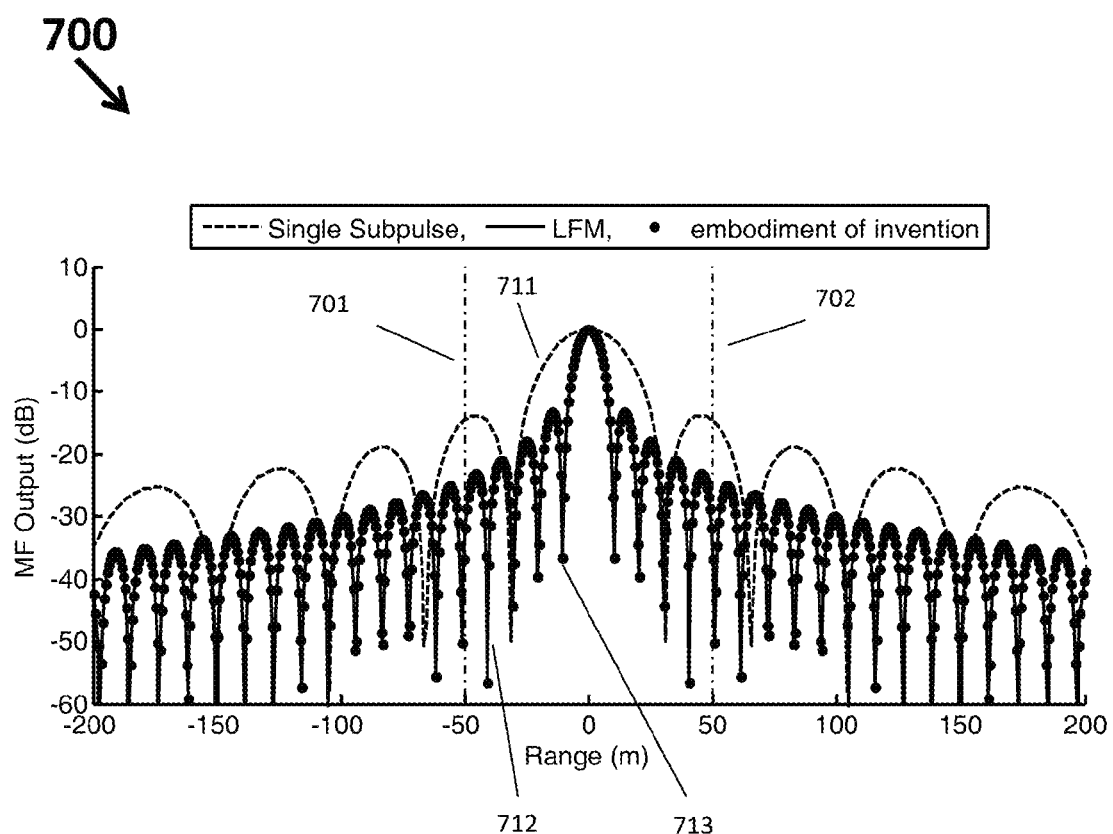
FIGS. 7A, and 7B illustrate the result of applying a matched filter for a particular LFM waveform, and a method in accordance with an embodiment of the present invention to a particular FJB waveform of the same bandwidth, and a matched filter to a single subpulse of the particular FJB waveform.

FIG. 7A shows a solid line for a matched filter output at output 411, for a prior known method for a situation where a 75 MHz LFM waveform signal is transmitted from the transmitter/receiver 130 of the apparatus 100, and a received signal or signals comes back and/or is delayed or modified at input 410 shown in FIG. 4. FIG. 7A also shows dots for data for processing output signal at output 431 from an embodiment of the present invention for a 75 MHz FJB waveform signal transmitted from transmitter/receiver 130 of apparatus 100 with three subpulses 331, 332, and 333 shown in FIG. 3, FIG. 7A also shows dashed line data for a matched filter output signal, at output 411 from a known matched filter such as 421 from a single 25 MHz subpulse of the 75 MHz FJB transmitted waveform transmitted by transmitter/receiver 130, and received back at 410, in a diagram 700. The results for dots or points for data shown in FIG. 7A for an embodiment of the present invention correspond closely to the solid line data for a known matched filter for a 75 MHz LFM known waveform.

Figure 7B:
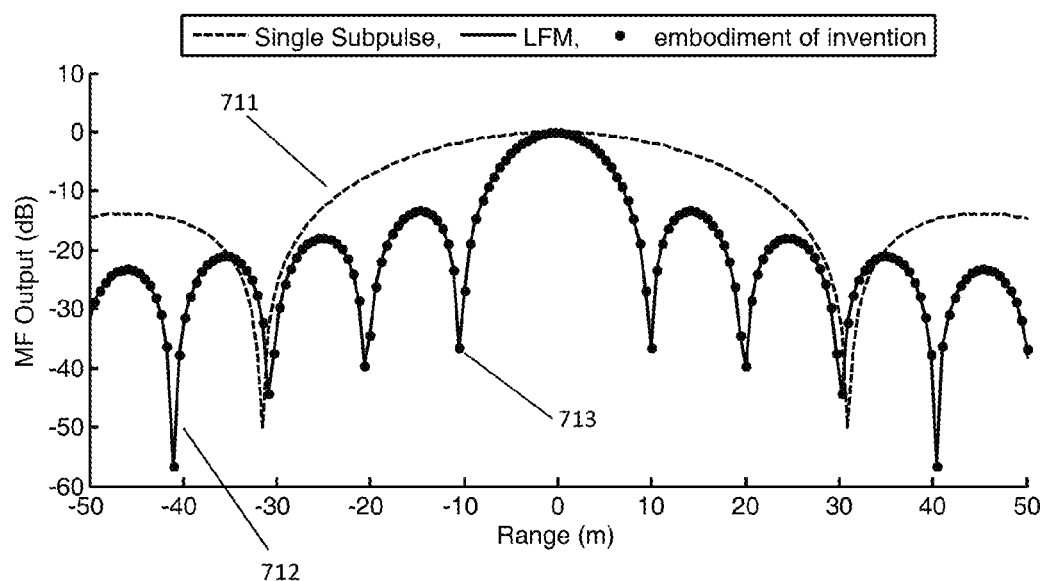

A close-up view between the lines 701 and 702 near the mainlobe of the three different transmit signals((a) dashed lines 711—known single 25 MHz subpulse (b) solid lines 712—known 75 MHz LFM signal, (c) dots or points data 713 for 75 MHz FJB waveform of an embodiment of present invention are shown in a diagram 710 in FIG. 7B.

The three subpulses 331, 332, and 333 of the FJB waveform are effectively combined to form a single pulse with the same duration and bandwidth of the LFM pulse and hence yield exactly the same mainlobe resolution as shown in 710 of FIG. 7B, and the same sidelobe roll-off as shown in 700 of FIG. 7A. The matched filter output at output 411 of FIG. 4 of a single subpulse of the FJB is shown for reference as dashed lines in FIG. 7B.

Figure 8A:
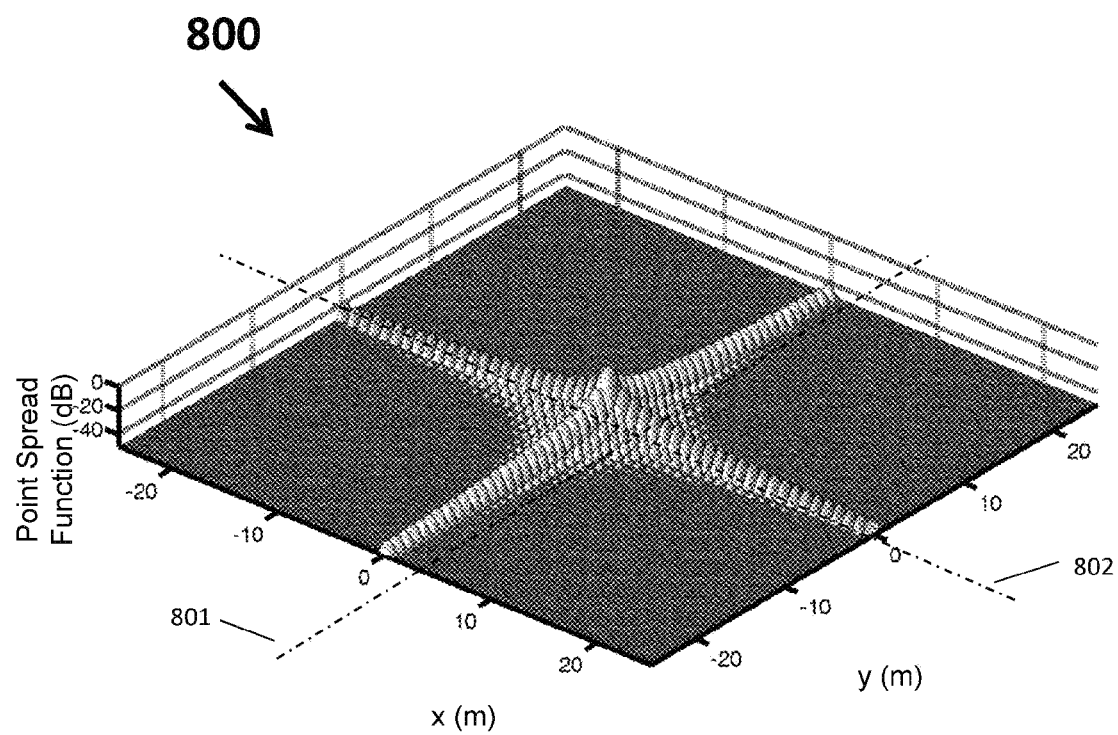
FIGS. 8A, 8B, and 8C illustrate an example of a system point spread function for a particular FJB waveform at broadside.

FIG. 8A illustrates the system point spread function 800 obtained using an embodiment of the present invention for an FJB waveform transmit signal transmitted from transmitter/receiver 130 of apparatus 100 with six subpulses and a total bandwidth of 150 MHz (25 MHz per subpulse), transmitted at a PRF (pulse repetition frequency) of 7.362 kHz (kilohertz) and a standoff range of 10 km (kilometers) with the platform 220 on which apparatus 100 is located, flying in the positive y dimension looking along the x-axis. FIG. 8A shows point spread function in dB on a z axis, x distance of the transmitter/receiver 130 on the platform 220 from the point 202 in meters, and y distance of the transmitter/receiver 130 on the platform 220 from the point 202 in meters.

Figure 8B:
Figure 8B:
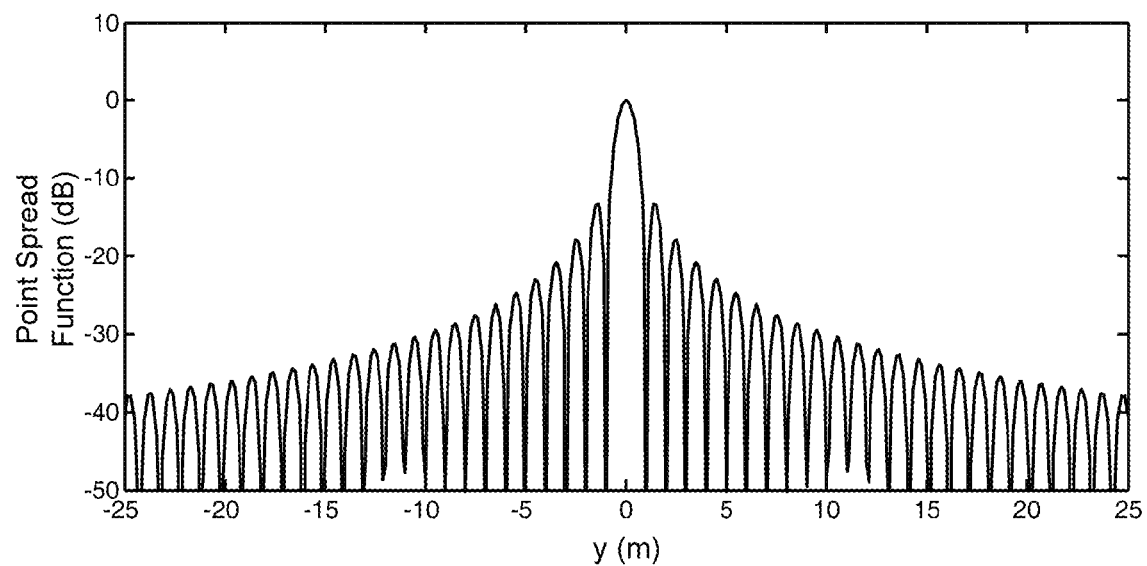
Figure 8C:
Figure 8C:
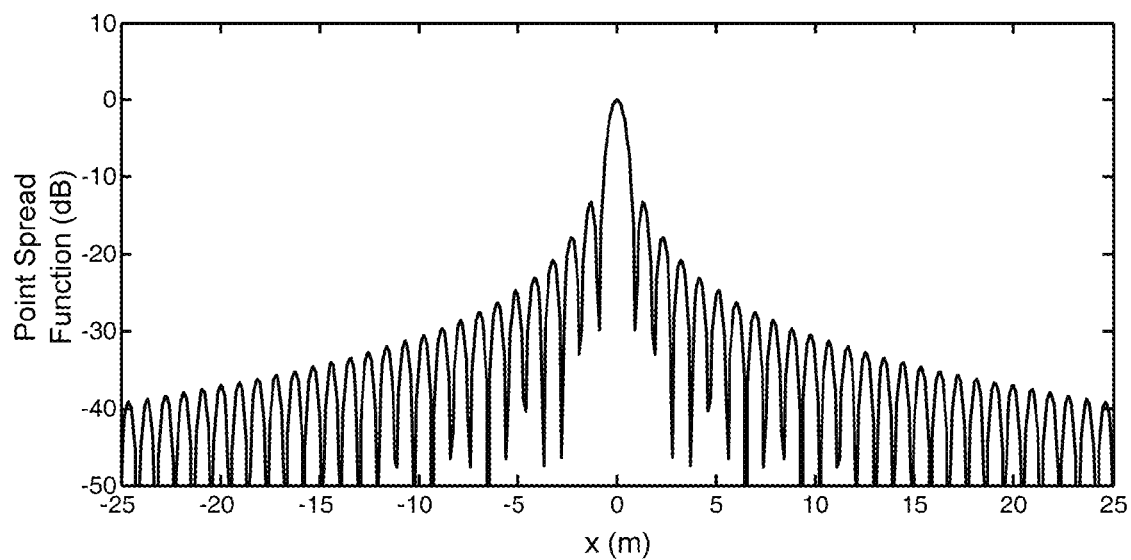

The platform 220 on which apparatus 100 is located, flies in a straight line covering an equal angle of 0.5° on either side of the point (0, 0) meter, placing the point scatterer used to obtain the point spread function directly at broadside. The primary component of 800 along cross-range 801 is shown in FIG. 8B as 810, and the primary component of 800 along range 802 is shown in FIG. 8C as 820 FIG. 8B shows the cut of the point spread function in 800 when x=0 in dB on the vertical axis and distance of the transmitter/receiver 130 on the platform 220 from the point 202 in meters on the horizontal axis as "y" in meters. FIG. 8C shows the cut of the point spread function in 800 when x=0 in dB of on the vertical axis and distance of the transmitter/receiver 130 on the platform 220 from the point 202 in meters on the horizontal axis as "x" in meters.

Figure 9A:
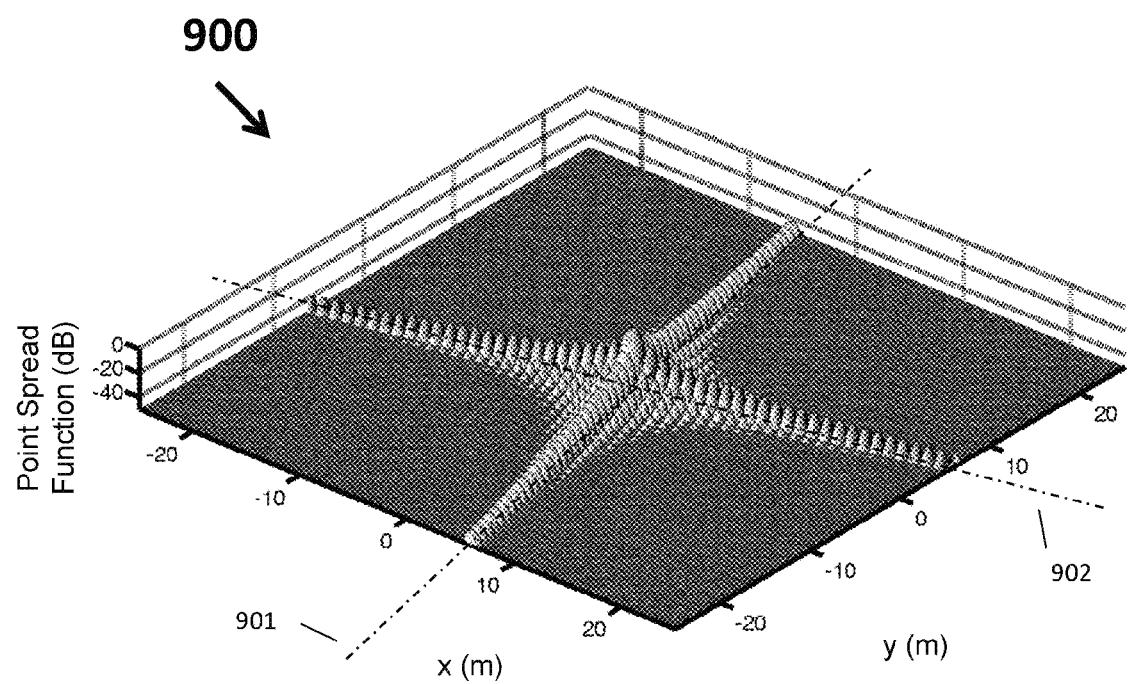
FIGS. 9A, 9B, and 9C illustrate an example of a system point spread function for a particular FJB waveform off broadside.
Figure 9B:
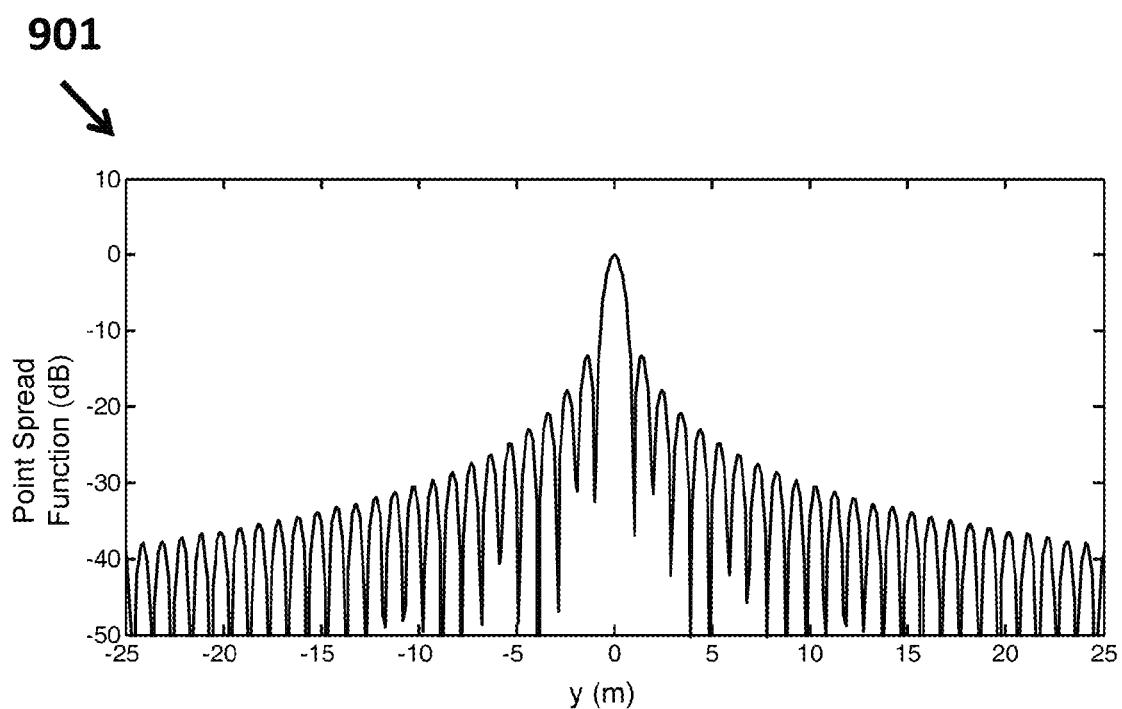
Figure 9C:
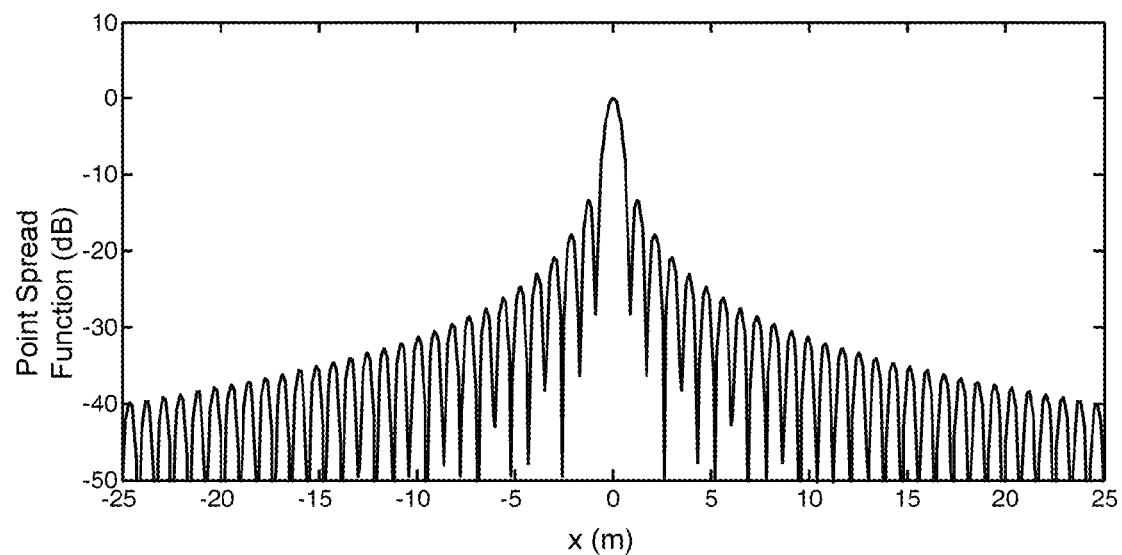

FIG. 9A illustrates the system point spread function 900 obtained using an embodiment of the present invention for an FJB waveform transmit signal transmitted from the transmitter/receiver 130 of the apparatus 100 on the platform 220 with six subpulses and a total bandwidth of 150 MHz (25 MHz per subpulse), transmitted at a PRF of 7.362 kHz and a standoff range of 10 km with the platform 220 on which the apparatus 100 is located, flying in the positive y dimension looking along the x-axis. The platform 220 flies in a straight line covering an angle of 1° with respect to the point (0,0) meter, where the point scatterer used to obtain the point spread function is at a squint angle of 13° with respect to the platform 220. The primary component of 900 along cross-range 901 is shown in FIG. 9B as diagram 910, and the primary component of 900 along range 902 is shown in FIG. 9C as diagram 920.

FIG. 9A shows point spread function in dB on a z axis. x axis and y axis correspond to the distances in meters from the scatter located at the center of the image (0,0). FIG. 9B shows a cut of the point spread function 900 along the range 901 that joints the center of the image at (0,0) and the platform 220. FIG. 9B shows the cut of the point spread function in dB on the vertical axis and distance of points on range 901 from the point at the center of the image at (0,0) in meters on the horizontal axis as "y" in meters. FIG. 9C shows a cut of the point spread function 900 along the cross range 902 that passes the center of the image at (0,0) and is perpendicular to the range 901. FIG. 9C shows the cut of the point spread function in dB on the vertical axis and distance of points on cross range 902 from the point at the center of the image at (0,0) in meters on the horizontal axis as "x" in meters.

FIG. 10 shows a flow chart 1000 of a method in accordance with an embodiment of the present invention. At step 1002, the variable m, which indicates a particular pulse of a transmitted signal from the transmitter/receiver 130, may be set to zero by the computer processor 110 in the computer memory 120 in accordance with computer software stored in the computer memory 120. At step 1004 the variable k which indicates a particular subpulse of a particular pulse of the transmitted signal from the transmitter/receiver 130, may be set to zero by the computer processor 110 in the computer memory 120 in accordance with computer software stored in the computer memory 120.

At step 1006 the computer processor 110 may cause the transmitter/receiver 130 to transmit the $(k+1)^{th}$ subpulse of the $(m+1)^{th}$ pulse of the transmission signal. At step 1008, a receiver of the transmitter/receiver 130 may receive and/or collect a received signal or echo signal z(t,m,k), back from a target for example, due to the $(k+1)^{th}$ subpulse of the $(m+1)^{th}$ pulse of the transmission signal. At step 1010 the received signal z(t,m,k) is delayed, by the computer processor 110, to form ž(t,m,k), which may be stored in computer memory 120. At step 1012, the delayed signal ž(t,m,k) is supplied to the inputs 421a, 422a, and 423a of filters 421, 422, and 423, respectively, as well as to the inputs of any further filters provided as shown by FIG. 4 by the computer processor 110. At step 1014, the outputs of filters 421, 422, and 423 are combined to form signal g(t,m,k) at output 431 of summation device 430, by the computer processor 430, and the signal g(t,m,k) may be stored in computer memory 120 by the computer processor 110.

At step 1016, the signal g(t,m,k) is supplied to the SAR processor 424 which produces a coarse range/cross range resolution SAR map, which may be stored by the computer processor 110 in the computer memory 120, for signal g(t,m,k). At step 1018, k is incremented by the computer processor 110 in the computer memory 120, for the next subpulse. At step 1020, the computer processor 110 determines if k is now equal to K (the number of subpulses) and if not the process loops back to 1006 to process the next subpulse of the $(m+1)^{th}$ pulse. If k=K, m is incremented by the computer processor 110 in the computer memory 120 at step 1022. At step 1024, the computer processor 110 determines if m is equal to M (the total number of pulses transmitted in the transmission signal) and if not the process loops back to 1004 and reset k=0 to process the first subpulse of the next pulse at step 1006.

If m is equal to M then this means that the computer processor 110 has determined and saved in the computer memory 120 coarse range/cross-range resolution SAR maps for all K subpulses and for all M pulses. Thus K times M coarse range/cross-range resolution SAR maps would be stored in computer memory 120 by the computer processor 110. At step 1026 the computer processor 110 resets the variable k to zero. At step 1028 the SAR processor 424, which may be implemented by the computer processor 110 by programming stored in the computer memory 120, combines M coarse range/cross resolution SAR maps for subpulse k. At step 1030, k is incremented by the computer processor 110. At step 1032 the computer processor 110 determines if k=K, wherein K is the total number of subpulses. If no, then the computer processor 110 proceeds with the next subpulse and combines M coarse range/cross range resolution SAR maps for that subpulse. The loop including step 1028, 1030, and 1032 results in K combinations of coarse range resolution SAR maps, wherein each combination is based on all M pulses of the transmit signal from the transmitter/receiver 130. As an example, the first combination (k=0) produced by the step 1028 is a combination of SAR maps produced at output 417 for the first subpulse (k=0) of the first pulse (m=0), the first subpulse (k=0) of the second pulse (m=1), and the first subpulse (k=0) of any subsequent pulses.

If the computer processor 110 determines that k=K at step 1032 then the summation device 514, which may be implemented by the computer processor 110, is used, at step 1034 to combine the K combinations of coarse range resolution SAR maps to form one overall SAR map relating to all K subpulses of all M pulses of the transmit signal transmitted from transmitter/receiver 130. The SAR map formed at step 1034 has the range resolution promised by the overall transmit bandwidth of all K subpulses. The procedure ends at step 1036.

We claim:
1. A method
wherein each of variables k and m starts out at with a value of zero, and comprising the steps of:
transmitting $(k+1)^{th}$ subpulse of $(m+1)^{th}$ pulse of a transmit signal from a transmitter, wherein the transmit signal includes M pulses and wherein each of the M pulses has K subpulses, wherein each of M and K are positive integers;
receiving a return signal due to the $(k+1)^{th}$ subpulse of the $(m+1)^{th}$ pulse of the transmit signal at a receiver;
supplying a filter input signal for the $(k+1)^{th}$ subpulse of the $(m+1)^{th}$ pulse, which is based on the return signal due the $(k+1)^{th}$ subpulse of the $(m+1)^{th}$ pulse, to a plurality of filter inputs of a corresponding plurality of filters;
using the plurality of filters to produce a corresponding plurality of filter output signals for the $(k+1)^{th}$ subpulse of the $(m+1)^{th}$ pulse, at a corresponding plurality of filter outputs;
combining the plurality of filter output signals for the $(k+1)^{th}$ subpulse of the $(m+1)^{th}$ pulse to produce a combination filtered signal for the $(k+1)^{th}$ subpulse of the $(m+1)^{th}$ pulse;

supplying the combination filtered signal for the $(k+1)^{th}$ subpulse of the $(m+1)^{th}$ pulse to a synthetic aperture radar processor;

using the synthetic aperture radar processor to produce a coarse range/cross range resolution synthetic aperture radar map for the combination filtered signal for the $(k+1)^{th}$ subpulse of the $(m+1)^{th}$ pulse of the transmit signal;

incrementing k, and then repeating the above steps, until k equals the number K;

incrementing m, restarting k at a value of zero, and then repeating the above steps, until m equals the number M;

wherein the above steps produce a plurality of coarse range/cross range resolution synthetic aperture radar maps, one coarse range/cross range resolution synthetic aperture radar map for each subpulse of each pulse of the transmit signal;

combining the coarse range/cross range resolution synthetic aperture radar maps for the $i^{th}$ subpulses of all M pulses, for i=1 to K, to produce K coarse range resolution synthetic radar aperture maps; and combining the K coarse range resolution synthetic radar aperture maps to produce a final combined map.

2. The method of claim 1 wherein
the transmit signal is a frequency jump burst-type waveform.

3. The method of claim 1 wherein
M is equal to 1.

4. The method of claim 1 wherein
the step of using the synthetic aperture radar processor to produce the coarse range/cross range resolution synthetic aperture radar map for the combination filtered signal for the $(k+1)^{th}$ subpulse of the $(m+1)^{th}$ pulse of the transmit signal;

and the step of combining the $i^{th}$ subpulses of all M pulses, for i=1 to K, to produce K coarse range resolution synthetic radar aperture maps are performed at the same time.

5. The method of claim 1 wherein
the step of using the synthetic aperture radar processor to produce the coarse range/cross range resolution synthetic aperture radar map for the combination filtered signal for the $(k+1)^{th}$ subpulse of the $(m+1)^{th}$ pulse of the transmit signal;

the step of combining the $i^{th}$ subpulses of all M pulses, for i=1 to K, to produce K coarse range resolution synthetic radar aperture maps; and the step of combining the K coarse range resolution synthetic radar aperture maps to produce the final combined map are performed at the same time.

6. The method of claim 1 wherein
the steps are implemented by a computer processor.

7. The method of claim 6 wherein
the return signal, the plurality of filter input signals, the plurality of filter output signals, the combination filtered signal, and the coarse range/cross resolution synthetic aperture radar map for each of the K subpulses of each of the M pulses, are stored in a computer memory by the computer processor.

8. The method of claim 7 wherein
the K coarse range resolution synthetic radar aperture maps, and final combined map, are stored in the computer memory by the computer processor.

9. An apparatus comprising
a transmitter;
a receiver;
a computer processor; and
a computer memory;

wherein each of variables k and m starts out at with a value of zero, and wherein the computer processor is programmed by a computer program stored in the computer memory to execute the following sequence of operations:

to cause the transmitter to transmit a $(k+1)^{th}$ subpulse of an $(m+1)^{th}$ pulse of a transmit signal from the transmitter, wherein the transmit signal includes M pulses and wherein each of the M pulses has K subpulses, wherein each of M and K are positive integers;

to cause the receiver to receive a return signal at the receiver due to the $(k+1)^{th}$ subpulse of the $(m+1)^{th}$ pulse of the transmit signal;

to supply a filter input signal for the $(k+1)^{th}$ subpulse of the $(m+1)^{th}$ pulse, which is based on the return signal due the $(k+1)^{th}$ subpulse of the $(m+1)^{th}$ pulse, to a plurality of filter inputs of a corresponding plurality of filters;

to use the plurality of filters to produce a corresponding plurality of filter output signals for the $(k+1)^{th}$ subpulse of the $(m+1)^{th}$ pulse, at a corresponding plurality of filter outputs;

to combine the plurality of filter output signals for the $(k+1)^{th}$ subpulse of the $(m+1)^{th}$ pulse to produce a combination filtered signal for the $(k+1)^{th}$ subpulse of the $(m+1)^{th}$ pulse;

to supply the combination filtered signal for the $(k+1)^{th}$ subpulse of the $(m+1)^{th}$ pulse to a synthetic aperture radar processor;

to use the synthetic aperture radar processor to produce a coarse range/cross range resolution synthetic aperture radar map for the combination filtered signal for the $(k+1)^{th}$ subpulse of the $(m+1)^{th}$ pulse of the transmit signal;

wherein the computer processor is programmed by a computer program stored in the computer memory to increment k, and then repeat the sequence of operations, until k equals the number K;

wherein the computer processor is programmed by a computer program stored in the computer memory to increment m, restarting k at a value of zero, and then to repeat the sequence of operations, until m equals the number M;

wherein the computer processor by the repetition of the sequence of operations produces a plurality of coarse range/cross range resolution synthetic aperture radar maps, one coarse range/cross range resolution synthetic aperture radar map for each subpulse of each pulse of the transmit signal;

wherein the computer processor is programmed by a computer processor stored in the computer memory to combine the coarse range/cross range resolution synthetic aperture radar maps for the $i^{th}$ subpulses of all M pulses, for i=1 to K, to produce K coarse range resolution synthetic radar aperture maps; and wherein the computer processor is programmed by a computer program stored in the computer memory to combine the K coarse range resolution synthetic radar aperture maps to produce a final combined map.

10. The apparatus of claim 9 wherein
the transmit signal is a frequency jump burst-type waveform.

11. The apparatus of claim 9 wherein M is equal to 1.

12. The apparatus of claim 9 wherein
the computer processor is programmed to use the synthetic aperture radar processor to produce the coarse range/cross range resolution synthetic aperture radar map for the combination filtered signal for the $(k+1)^{th}$ subpulse of the $(m+1)^{th}$ pulse of the transmit signal; and to combine the coarse range/cross range resolution synthetic aperture radar maps for the $i^{th}$ subpulses of all M pulses, for i=1 to K, to produce K coarse range resolution synthetic radar aperture maps at the same time.

13. The apparatus of claim 9 wherein
the computer processor is programmed to use the synthetic aperture radar processor to produce the coarse range/cross range resolution synthetic aperture radar map for the combination filtered signal for the $(k+1)^{th}$ subpulse of the $(m+1)^{th}$ pulse of the transmit signal; to combine the coarse range/cross range resolution synthetic aperture radar maps for the $i^{th}$ subpulses of all M pulses, for i=1 to K, to produce K coarse range resolution synthetic radar aperture maps; and to combine the K coarse range resolution synthetic radar aperture maps to produce the final combined map at the same time.

14. The apparatus of claim 9 wherein
the computer processor is programmed by a computer program stored in the computer memory to store the return signal, the plurality of filter input signals, the plurality of filter output signals, the combination filtered signal, and the coarse range/cross resolution synthetic aperture radar map for each of the K subpulses of each of the M pulses in the computer memory.

15. The apparatus of claim 14 wherein
the computer processor is programmed by a computer program stored in the computer memory to store the K coarse range resolution synthetic radar aperture maps, and final combined map, in the computer memory.

\* \* \* \* \*